(12) United States Patent
Kamoto et al.

(10) Patent No.: US 7,432,315 B2
(45) Date of Patent: Oct. 7, 2008

(54) INK COMPOSITION, RECORDING METHOD AND RECORDING IMAGES USING THE SAME, AS WELL AS INK SET AND INK HEAD

(75) Inventors: Takanori Kamoto, Nara (JP); Masanori Kinomoto, Yamatokoriyama (JP); Hiromi Nakatsu, Amagasaki (JP); Kiyobumi Morimoto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 209 days.

(21) Appl. No.: 10/664,895

(22) Filed: Sep. 22, 2003

(65) Prior Publication Data
US 2004/0059020 A1 Mar. 25, 2004

(30) Foreign Application Priority Data
Sep. 18, 2002 (JP) ............................. 2002-271690

(51) Int. Cl.
*C09D 11/00* (2006.01)
(52) U.S. Cl. ...................................... 523/160; 523/161
(58) Field of Classification Search ................. 523/160, 523/161
See application file for complete search history.

(56) References Cited

U.S. PATENT DOCUMENTS

| | | | |
|---|---|---|---|
| 4,625,220 A * | 11/1986 | Nagashima ................... 347/19 |
| 4,723,129 A * | 2/1988 | Endo et al. ..................... 347/56 |
| 4,990,593 A * | 2/1991 | Blount ......................... 528/272 |
| 5,085,698 A | 2/1992 | Ma et al. |
| 5,129,947 A * | 7/1992 | Sharma et al. ................ 524/386 |
| 5,169,881 A * | 12/1992 | Peters et al. .................. 523/319 |
| 5,464,883 A * | 11/1995 | Sharma et al. ................ 523/161 |
| 5,496,874 A * | 3/1996 | Faass et al. ..................... 524/56 |
| 5,630,868 A * | 5/1997 | Belmont et al. ........... 106/31.75 |
| 5,716,436 A * | 2/1998 | Sorriero et al. ........... 106/31.87 |
| 5,748,208 A * | 5/1998 | Uchiyama et al. .............. 347/43 |
| 5,922,118 A * | 7/1999 | Johnson et al. ............. 106/31.6 |
| 5,977,209 A * | 11/1999 | Breton et al. ................. 523/160 |
| 6,040,358 A | 3/2000 | Page et al. |
| 6,046,253 A * | 4/2000 | Erdtmann et al. ............ 523/160 |
| 6,187,084 B1 * | 2/2001 | Bradbury et al. ............ 106/31.5 |
| 6,344,497 B1 * | 2/2002 | Meyrick et al. .............. 523/160 |
| 6,384,108 B1 * | 5/2002 | Breton et al. ................. 523/161 |
| 6,454,402 B1 * | 9/2002 | Koitabashi et al. ........... 347/100 |
| 6,530,986 B2 * | 3/2003 | Walker et al. ............... 106/31.6 |
| 6,533,408 B1 * | 3/2003 | Erdtmann et al. ............ 347/100 |
| 6,715,869 B1 * | 4/2004 | Reem et al. .................. 347/100 |
| 6,773,102 B2 * | 8/2004 | Chen et al. ................... 347/100 |
| 6,800,673 B2 * | 10/2004 | Yamanouchi et al. ........ 523/160 |
| 2002/0113854 A1 | 8/2002 | Erdtmann et al. |
| 2003/0018100 A1 * | 1/2003 | Foucher et al. .............. 523/160 |
| 2003/0027893 A1 * | 2/2003 | Campbell et al. ............ 523/160 |
| 2003/0187098 A1 * | 10/2003 | Chen et al. ................... 523/160 |
| 2004/0110865 A1 * | 6/2004 | McCovick et al. ........... 523/160 |

FOREIGN PATENT DOCUMENTS

| | | |
|---|---|---|
| JP | 09/087558 | 3/1997 |
| JP | 2635235 | 4/1997 |
| JP | 10-195353 | 7/1998 |
| JP | 11-021489 | 1/1999 |
| JP | 3122405 | 10/2000 |
| JP | 2002-138231 | 5/2002 |

OTHER PUBLICATIONS

JP 2002-240413, Aug. 28, 2002 (equivalent to US 2002-0113854 A1).

* cited by examiner

*Primary Examiner*—Edward J Cain
(74) *Attorney, Agent, or Firm*—Nixon & Vanderhye P.C.

(57) ABSTRACT

An ink composition is prepared by incorporating water, a colorant and a polyester resin in which a polybasic carboxylic acid ingredient contains an aromatic dicarboxylic acid having a metal sulfonate group. The ink composition is stored in an ink tank of an ink head, the ink composition is supplied from the ink tank into an ink chamber having a discharge port, a voltage is applied to partition wall portions formed of a piezoelectric material, a pressure is applied to the ink composition contained in the ink chamber by the partition wall portions and liquid droplets of the ink composition are discharged from the discharge port and deposited on a recording material thereby recording images.

27 Claims, 6 Drawing Sheets

INK COMPOSITION, RECORDING METHOD AND RECORDING IMAGES USING THE SAME, AS WELL AS INK SET AND INK HEAD

This application claims priority to Japanese Application No. 2002-271690, filed 18 Sep. 2002. The entire contents of this application is incorporated herein by reference.

BACKGROUND OF THE INVENTION

1. Field of Invention

The present invention concerns an ink composition used suitably in a ink jet recording method, a recording method for recording images using the same, as well as an ink set and an ink head.

2. Description of the Related Art

An ink jet recording method is a typical non-impact recording method of discharging and flying liquid droplets of an ink composition (hereinafter also referred to simply as "ink") by using a kinetic energy or thermal energy and depositing liquid droplets on a recording material such as paper thereby recording images. The ink jet recording method has advantages that noises during recording are reduced compared with an impact recording method, the size of the apparatus can be decreased easily since development and fixing processes indispensable, for example, in electrophotographic recording method are not required and high speed recording is possible. Among the ink jet recording method, an on demand type ink jet recording method of discharging ink droplets in response to digital signals are relatively inexpensive in view of the apparatus and color processing is easy compared with a continuous ink jet recording method of continuously discharging ink droplets, so that this is generally used in recent years as output equipments for office equipments or personal computers for home use.

An ink jet recording apparatus for recording images by using an ink jet recording method is required for providing recording images at high image quality comparable with recording images by electrophotographic recording process at high speed and stably. Further, durability such as water proofness and light fastness are required for the formed recording images.

As a technique for improving the water proofness and light fastness of recorded images, a method of using a pigment for a colorant contained in an ink has been studied. While the most general method is a method of dispersing a pigment in an ink, since the particle size of pigment particles in the ink is large and the pigment tends to be precipitated in this method, it involves a problem of tending to cause clogging at the top end of a nozzle for discharging ink droplets and not capable of providing recorded images stably.

In recent years, the problem for the precipitation of the pigment has been solved along with the development of the dispersion technique. When images are formed on a recording material having feel of gloss nearly to that of printed paper photography referred to as gloss paper as one of recording sheets used in an ink jet recording method, it results in an additional problem that the pigment ingredient from the recording material.

Further, when recorded images formed by using an ink in which a pigment is dispersed is traced by a pen using an aqueous ink such as a marker pen, this results in a problem that recorded images are blurred or pigment is peeled from the recording material to disturb the recorded images.

For example, in Japanese Examined Patent Publication JP-B2 2635235 is disclosed an ink with an improved dispersion stability of a pigment in the ink by using an AB or ABA block copolymer of a hydrophobic block A and a hydrophilic block B. However, recorded images formed by using the ink are poor in the scratch resistance leading to a practical problem such as defoliation of the pigment ingredient from the recording material.

In order to solve the foregoing problems, the ink in which the pigment is dispersed is required to provide recorded images of excellent water proofness and scratch resistance in addition to stable dispersion of the pigment into the ink.

For example, in Japanese Examined Patent Publication JP-B2 3122405 is proposed a technique of improving the water proofness and scratch resistance of recorded images without deteriorating the dispersion stability of a pigment. In this technique, in order to improve the water proofness and scratch resistance, a water soluble elastomeric block polymer ABA comprising an elastomeric block B and a non-elastomeric block A is incorporated.

However, while the technique disclosed in Japanese Patent No. 3122405 is effective in the case of using a recording material with rough surface having large inter-fiber distance such as common paper, sufficient scratch resistance can not be obtained in the case of using a recording material with smooth surface having a coating layer containing fine particles disposed on the upper surface thereof.

SUMMARY OF THE INVENTION

The invention intends to provide an ink composition suitable to an ink jet recording method capable of obtaining recording images of high quality with less blurrs and excellent in water proofness and scratch resistance, a recording method and recorded images using the same, as well as an ink set and an ink head.

The invention provides an ink composition comprising:
water;
a colorant; and
a polyester resin containing a polybasic carboxylic acid ingredient and a polyhydric alcohol ingredient,
the polybasic carboxylic acid ingredient containing an aromatic dicarboxylic acid having a metal sulfonate group.

In accordance with the invention, the ink composition comprises water, a colorant and a polyester resin containing a polybasic carboxylic acid ingredient and a polyhydric alcohol ingredient in which the polybasic carboxylic acid ingredient contains an aromatic dicarboxylic acid having a metal sulfonate group. Since the metal sulfonate group is dissociated into a sulfonic group and a metal ion in an aqueous solution, the polyester resin can be present being dispersed stably in the water-containing ink composition. That is, since the ink composition is a particle dispersion in which the polyester resin is dispersed in the aqueous solution, blurrs in the recorded material can be decreased. Further, the polyester resin functions as a binder for binding the recorded material and the colorant so as to cover the colorant. That is, since the colorant on the recorded material is covered with the polyester resin, is not in direct contact with water, and undergoes no direct mechanical contact, it is less leached or peeled from the recorded material, and recorded images formed by the ink composition are excellent in water proofness and scratch resistance. Accordingly, it is possible to obtain an ink composition suitable to an ink jet recording method capable of obtaining recorded images of high quality with less blurrs and excellent in water proofness and scratch resistance.

Further, in the invention it is preferable that the polyester resin has a number average molecular weight within a range of from 5,000 to 50,000.

In accordance with the invention, the polyester resin has the number average molecular weight of 5,000 or more and 50,000 or less. In cases where the number average molecular weight exceeds 50,000, since dispersion stability to water is deteriorated and the resin cannot be present being dispersed stably in the water containing ink composition, the discharge stability is deteriorated. In a case where the number average molecular weight is less than 5,000, since durability as the resin is deteriorated, no sufficient scratch resistance can be obtained. Accordingly, sufficient discharge stability and scratch distance can be obtained by defining the number average molecular weight as 5,000 or more and 50,000 or less as described above.

Further, in the invention, it is preferable that the polyester resin has a glass transition point Tg within a range of from −20° C. to 70° C.

In accordance with the invention, the polyester resin has a glass transition point Tg of −20° C. or higher and 70° C. or lower. When the glass transition point Tg exceeds 70° C., since the elongation at break decreases, the scratch resistance of recorded images is deteriorated. Further, since it is extremely hard as the resin to lower the close adhesion to the recorded material, it cannot function as a binder to deteriorate the scratch resistance of the recorded images. When the glass transition point Tg is lower than −20° C., tackiness is caused to the ink composition forming the recorded images and, in a case of recording images continuously, recorded images formed on a recorded material and the succeeding recorded material are adhered and a portion of the recorded images is transferred to the succeeding recorded material to sometimes cause disturbance in the recorded images. Further, the store stability of the ink composition is deteriorated. Accordingly, by defining the glass transition point Tg as −20° C. or higher and 70° C. or lower, sufficient scratch resistance for the recorded images can be attained and disturbance in the recorded images can be suppressed, as well as sufficient store stability of the ink composition can be obtained.

Further in the invention, it is preferable that the polyhydric alcohol ingredient contains at least one glycol selected from the group consisting of aliphatic glycols and cycloaliphatic glycols.

In accordance with the invention, the polyhydric alcohol ingredient contains at least one glycol selected from the group consisting of aliphatic glycols and cycloaliphatic glycols. Accordingly, since the glass transition point of the polyester resin can be controlled to obtain a polyester resin having a desired strength by changing the ratio of the glycol contained in the polyhydric alcohol ingredient, an ink composition suitable to the ink jet recording method capable of obtaining recorded images of high quality with less blurrs and excellent in water proofness and scratch resistance can be attained easily.

Further in the invention, it is preferable that electroconductivity of the water is 250 μS/cm or less.

In accordance with the invention, water has an electroconductivity of 250 μS/cm or less. The electroconductivity of the water depends on the amount of ion ingredients contained. The amount of the unnecessary ion ingredient contained in the water with the electroconductivity of 250 μS/cm or less is small and water purity is high. When the amount of the unnecessary ion ingredient contained in the water increases and the electroconductivity exceeds 250 μS/cm, since the sulfonic group of the polyester resin formed by the dissociation of the metal ion and the ion ingredient tend to be bonded, it is difficult to stably disperse the polyester resin in the ink composition. Accordingly, by defining the electroconductivity of the water to 250 μS/cm or less, the polyester resin can be dispersed stably in the ink composition.

Further in the invention, it is preferable that the colorant contains a pigment.

In accordance with the invention, since the colorant contains a pigment, recorded images of excellent light fastness and water proofness can be obtained. Further, since the ink composition contains a polyester resin dispersible in water, the pigment can be dispersed stably. Accordingly, since occurrence of clogging can be suppressed, an ink composition capable of obtaining recorded images of excellent light fastness and water proofness can be obtained without deteriorating the discharge stability.

Further in the invention, it is preferable that the pigment has a hydrophilic group.

In accordance with the invention, since the pigment has a hydrophilic group, it can be present being dispersed stably in the water-containing ink composition. That is, since the pigment has a hydrophilic group, the dispersion stability of the pigment in the ink composition can be enhanced.

Further in the invention, it is preferable that the hydrophilic group is at least one of carboxyl group and sulfonic group.

In accordance with the invention, since the hydrophilic group is at least one of carboxylic group and sulfonic group, the dispersion stability of the pigment in the ink composition can further be enhanced.

Further in the invention, it is preferable that the ink composition further comprises a water-soluble organic solvent having a vapor pressure lower than that of the water.

In accordance with the invention, since a water-soluble organic solvent having the vapor pressure lower than the vapor pressure of the water is further contained, drying can be suppressed to improve the discharge stability.

Further in the invention, it is preferable that the water-soluble organic solvent contains glycol ethers and/or polyhydric alcohols.

In accordance with the invention, since the water-soluble organic solvent contains glycol ethers and/or polyhydric alcohols, the discharge stability can be further improved.

Further in the invention, it is preferable that the ink composition further comprises a nonionic surfactant and content of the nonionic surfactant is at a critical micelle concentration or more.

In accordance with the invention, a nonionic surfactant is further contained, and the content of the nonionic surfactant is at the critical micelle concentration or more. Since the nonionic surfactant is not ionized in an aqueous solution, the dispersion stability of the polyester resin provided by the metal sulfonate group is not deteriorated. Further, while the surface tension of a solution containing a surfactant lowers along with increase of the surfactant up to the critical micelle concentration, since it is substantially constant at the critical micelle concentration or more, the effect of the nonionic surfactant can be attained sufficiently to lower the surface tension of the ink composition sufficiently by incorporation of the nonionic surfactant at the critical micelle concentration or more as described above. Accordingly, since the wettability between the ink composition and the inner wall of an ink chamber in the recording apparatus in a case of use for the ink jet recording method is made favorable without deteriorating the dispersion stability of the polyester resin and the ink composition can be supplied stably to the ink chamber, the discharge stability can be improved.

Further in the invention, it is preferable that the pigment contains at least one of C.I. pigment blue 15:3 and C.I. pigment blue 15:4.

In accordance with the invention, since the pigment contains at least one of C.I. pigment blue 15:3 and C.I. pigment blue 15:4, an ink composition capable of attaining recorded images of excellent cyan color developability can be obtained.

Further, in the invention, it is preferable that the pigment contains at least one selected from the group consisting of C.I. pigment red 122, C.I. pigment red 209 and C.I. pigment violent 19.

In accordance with the invention, since the pigment contains at least one selected from the group consisting of C.I. pigment red 122, C.I. pigment red 209 and C.I. pigment violent 19, an ink composition capable of attaining recorded images of excellent magenta color developability can be obtained.

Further in the invention, it is preferable that the pigment contains at least one selected from the group consisting of C.I. pigment yellow 74, C.I. pigment yellow 138, C.I. pigment yellow 150 and C.I. pigment yellow 180.

In accordance with the invention, since the pigment contains at least one selected from the group consisting of C.I. pigment yellow 74, C.I. pigment yellow 138, C.I. pigment yellow 150 and C.I. pigment yellow 180, an ink composition capable of attaining recorded images of excellent yellow color developability can be obtained.

Further in the invention, it is preferable that the pigment contains a carbon black.

In accordance with the invention, since the pigment contains a carbon black, an ink composition capable of attaining recorded images of excellent black color developability can be obtained.

Further, the invention provides a recording method of recording images comprising:

depositing an ink composition on a recording material, wherein for the ink composition is used one of the ink compositions mentioned above.

In accordance with the invention, since one of the ink compositions mentioned above is used for the recording method of recording images by depositing the ink composition on the recording material, recorded images of high quality with less blurrs and excellent in water proofness and scratch resistance can be provided.

Further, the invention provides a recording method of recording images comprising:

discharging liquid droplets of an ink composition by applying a pressure to the ink composition; and depositing the liquid droplets on a recording material, wherein for the ink composition is used one of the ink compositions mentioned above.

In accordance with the invention, since one of the ink compositions described above is used for recording method of recording images by discharging liquid droplets of the ink composition by applying a pressure to the ink composition and depositing the liquid droplets on the recording material, that is, an ink jet recording method, stable discharge is possible and recorded images of high quality with less blurrs and excellent in water proofness and scratch resistance can be provided.

Further, in the invention it is preferable that for the ink composition are used at least an ink composition in which the pigment contains at least one of C.I. pigment blue 15:3 and C.I. pigment blue 15:4, an ink composition in which the pigment contains at least one selected from the group consisting of C.I. pigment red 122, C.I. pigment red 209 and C.I. pigment violet 19, and an ink composition in which the pigment contains at least one selected from the group consisting of C.I. pigment yellow 74, C.I. pigment yellow 138, C.I. pigment yellow 150 and C.I. pigment yellow 180.

In accordance with the invention, since at least an ink composition capable of obtaining recorded images of excellent cyan color developability, an ink composition capable of obtaining recorded images of excellent magenta color developability and an ink composition capable of obtaining recorded images of excellent yellow color developability are used for the ink composition, full color recorded images of excellent color developability can be provided.

Further, in the invention it is preferable that for the ink composition are used at least an ink composition in which the pigment contains at least one of C.I. pigment blue 15:3 and C.I. pigment blue 15:4, an ink composition in which the pigment contains at least one selected from the group consisting of C.I. pigment red 122, C.I. pigment red 209 and C.I. pigment violet 19, and an ink composition in which the pigment contains at least one selected from the group consisting of C.I. pigment yellow 74, C.I. pigment yellow 138, C.I. pigment yellow 150 and C.I. pigment yellow 180, and an ink composition in which the pigment contains a carbon black.

In accordance with the invention, since for the ink composition are used at least, an ink composition capable of attaining recorded images of excellent cyan color developability, an ink composition capable of attaining recorded images of excellent magenta color developability, an ink composition capable of attaining recorded images of excellent yellow color developability, and an ink composition capable of attaining recorded images of excellent black color developability, full color recorded images of excellent color developability can be provided.

Further, the invention provides a recorded image which is recorded by the recording method mentioned above.

In accordance with the invention, since recorded images are recorded by the recording method mentioned above, recorded images of high quality with less blurrs and excellent in water proofness and scratch resistance can be obtained.

Further, the invention provides an ink set comprising:

the ink composition containing an pigment which contains at least one of C.I. pigment blue 15:3 and C.I. pigment blue 15:4;

the ink composition containing a pigment which contains at least one selected from the group consisting of C.I. pigment red 122, C.I. pigment red 209 and C.I. pigment violet 19, and the ink composition containing a pigment which contains at least one selected from the group consisting of C.I. pigment yellow 74, C.I. pigment yellow 138, C.I. pigment yellow 150 and C.I. pigment yellow 180.

In accordance with the invention, since the ink set comprises the ink composition capable of attaining recorded images of excellent cyan color developability, the ink composition capable of attaining recorded images of excellent magenta color developability, and the ink composition capable of attaining recorded images of excellent yellow color developability, an ink set of excellent color balance can be obtained and full color recorded images of excellent color developability can be attained.

Further, the invention provides an ink set comprising:

the ink composition containing a pigment which contains at least one of C.I. pigment blue 15:3 and C.I. pigment blue 15:4, the ink composition containing a pigment which contains at least one selected from the group consisting of C.I. pigment red 122, C.I. pigment red 209 and C.I. pigment violet 19, the ink composition containing a pigment which contains at least one selected from the group consisting of C.I. pigment yellow 74, C.I. pigment yellow 138, C.I. pigment yellow 150 and C.I. pigment yellow 180, and the ink composition containing a pigment which contains a carbon black.

In accordance with the invention, since the ink set comprises the ink composition capable of attaining recorded images of excellent cyan color developability, the ink composition capable of attaining recorded images of excellent magenta color developability, the ink composition capable of attaining recorded images of excellent yellow color developability, and the ink composition capable of attaining recorded images of excellent black color developability, an ink set of excellent color balance can be obtained and full color recorded images of excellent color developability can be attained.

Further, the invention provides an ink head comprising:

an ink tank for storing one of the ink compositions mentioned above;

an ink chamber having a discharge port for discharging liquid droplets of the ink composition, the ink chamber being supplied with the ink composition from the ink tank;

a piezoelectric element disposed to at least a portion of the ink chamber, for applying a pressure to the ink composition contained in the ink chamber, the piezoelectric element generating distortion in response to a voltage applied thereto, and an electrode for applying the voltage to the piezoelectric element.

In accordance with the invention, an ink head includes an ink tank for storing one of the ink compositions mentioned above, an ink chamber having a discharge port for discharging liquid droplets of the ink composition and being supplied with the ink composition from the ink tank, a piezoelectric element disposed to at least a portion of the ink chamber, for applying a pressure to the ink composition contained in the ink chamber by distortion of the piezoelectric element generated in response to a voltage applied thereto, and an electrode for applying the voltage to the piezoelectric element. This can provide a piezo-type ink head capable of discharging the liquid droplets of the ink composition from the discharge port according to the voltage applied to the piezoelectric element. Further, since the ink head stores one of the ink compositions mentioned above in the ink tank, the liquid droplets of the ink composition can be discharged stably from the discharge port to provide recorded images of high quality with less blurrs and excellent in water proofness and scratch resistance. A piezo-type ink jet recording apparatus of high reliability can be realized by the use of such an ink head.

Further, the invention provides an ink head comprising:

an ink tank for storing one of the ink compositions mentioned above, an ink chamber having a discharge port for discharging liquid droplets of the ink composition, the ink chamber being supplied with the ink composition from the ink tank;

a heat generation body disposed to at least a portion of the ink chamber, for heating the ink composition contained in the ink chamber to generate air bubbles and thereby applying a pressure to the ink composition, and an electrode for applying a voltage to the heat generation body.

In accordance with the invention, the ink head stores one of the ink compositions of the invention by the ink tank, contains the ink composition supplied from the ink tank by the ink chamber having the discharge port for the discharging liquid droplets of the ink composition, heats the ink composition contained in the ink chamber by the heat generation body disposed to at least a portion of the ink chamber to generate gas bubbles thereby applying a pressure to the ink composition. The electrode applies a voltage to the heat generation body. This can provide a thermal ink jet type ink head capable of discharging the liquid droplets of the ink composition from the discharge port according to the voltage applied to the heat generation body. Further, since the ink head stores one of the ink compositions of the invention in the ink tank, the liquid droplets of the ink composition can be discharged stably from the discharge port to provide recorded images of high quality with less blurrs and excellent in water proofness and scratch resistance. A thermal ink jet type ink jet recording apparatus of high reliability can be realized by the use of such an ink head.

Further, the invention provides a recorded image recorded by depositing liquid droplets of the ink composition which are discharged by the piezo-type ink head, on a recording material.

In accordance with the invention, since the recorded images are recorded by deposition, on the recording material, the liquid droplets of the ink composition discharged by the piezo-type ink head capable of discharging the liquid droplets of the ink composition stably as described above, recorded images of high quality can be obtained stably.

Further, the invention provides a recorded image recorded by depositing liquid droplets of the ink composition which are discharged by the thermal ink jet type ink head, on a recording material.

In accordance with the invention, since the recorded images are recorded by the deposition, on the recording material, the liquid droplets of the ink composition discharged by the thermal ink jet type ink head capable of discharging the liquid droplets of the ink composition stably as described above, recorded images of high quality can be obtained stably.

BRIEF DESCRIPTION OF THE DRAWINGS

Other and further objects, features, and advantages of the invention will be more explicit from the following detailed description taken with reference to the drawings wherein.

DETAILED DESCRIPTION FOR PREFERRED EMBODIMENT

Figure 1:
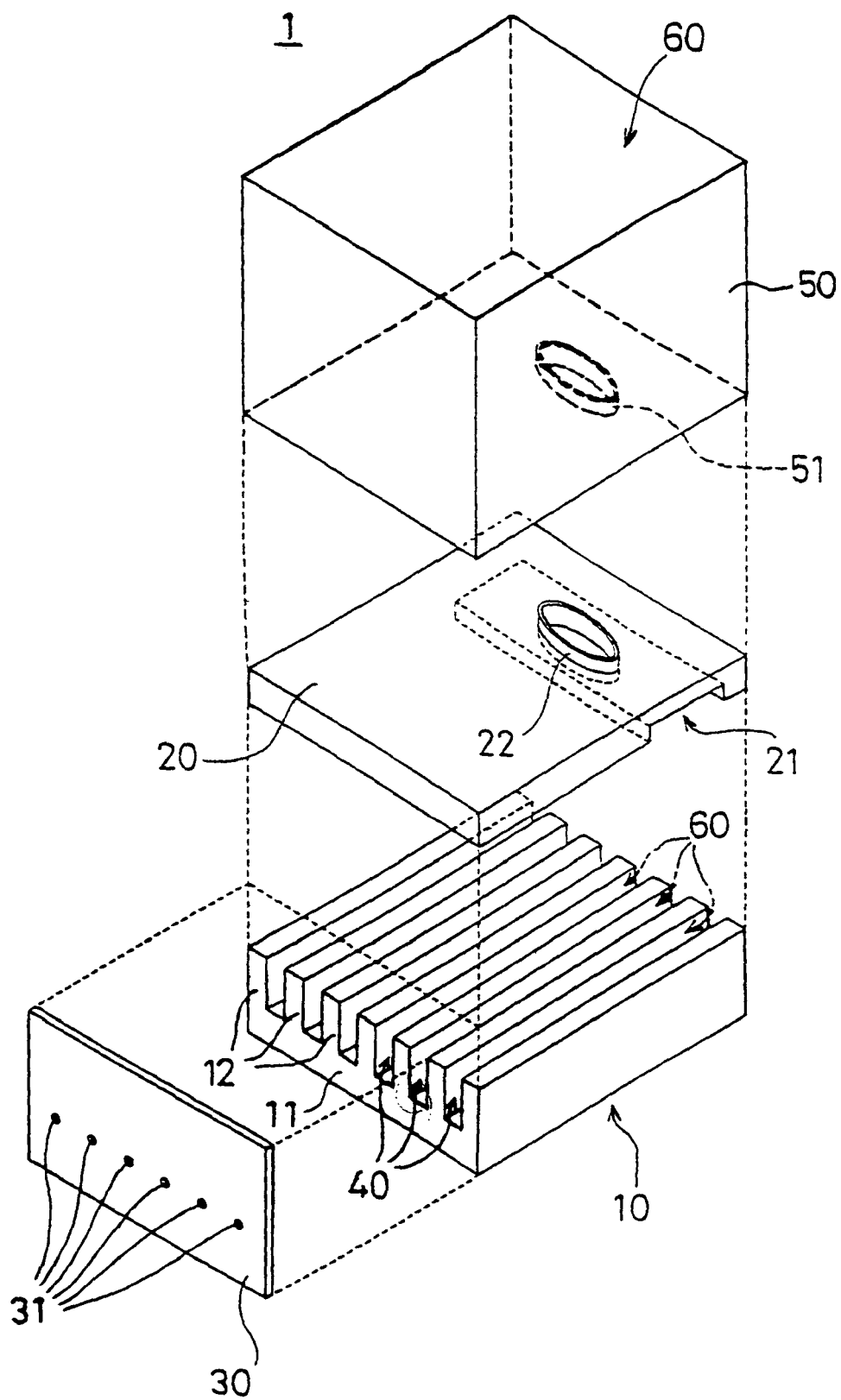
FIG. 1 is an exploded perspective view for the schematic constitution of an ink head as a second embodiment of the invention.

Now referring to the drawings, preferred embodiments of the invention are described below.

An ink composition as a first embodiment of the invention comprises water, a colorant and a polyester resin containing a polybasic carboxylic acid ingredient and a polyhydric alcohol ingredient in which the polybasic carboxylic acid ingredient contains an aromatic dicarboxylic acid having a metal sulfonate group. The polybasic carboxylic acid ingredient is a polybasic carboxylic acid itself and a derivative of the polybasic carboxylic acid, which is a structural unit derived from the polybasic carboxylic acid in the polyester resin. Further, the polyhydric alcohol ingredient is a polyhydric alcohol itself and a derivative of the polybasic carboxylic acid, which is a structural unit derived from the polyhydric alcohol in the polyester resin.

The ink composition in this embodiment is advantageously used for the ink jet recording method. In the ink jet recording method, liquid droplets of the ink composition are discharged by applying a pressure to the ink composition, and the liquid droplets are deposited on a recording material to thereby record images.

Since the metal sulfonate group is dissociated into a sulfonic group and a metal ion in an aqueous solution, the polyester resin can be present being dispersed stably in a water-containing ink composition. That is, since the ink composition of this embodiment is a particle dispersion in which the polyester resin is dispersed in an aqueous solution, blurrs in the recorded image can be decreased. Further, the polyester resin functions, on the recording material, as a binder for binding the recording material and the colorant so as to cover the colorant. That is, since the colorant on the recording material covered with the polyester resin, is not in direct contact with water and undergoes no mechanical direct contact, it is less leached or peeled from the recording material and the recorded images formed by the ink composition of this embodiment is excellent in water proofness and scratch resistance. Accordingly, an ink composition suitable to the ink jet recording method capable of obtaining recorded images of high quality with less blurrs and excellent in water proofness and scratch resistance can be realized.

The number average molecular weight of the polyester resin is preferably 5,000 or more and 50,000 or less. This can provide sufficient discharge stability and scratch resistance. In a case where the number average molecular weight exceeds 50,000, since the dispersion stability to water is deteriorated and it cannot be present being dispersed stably in the water containing ink composition, the discharge stability is deteriorated. In a case where the number average molecular weight is less than 5,000, since durability as a resin is deteriorated, no sufficient scratch resistance can be obtained. Accordingly, it is defined as 5,000 or more and 50,000 or less.

The polyester resin preferably has a glass transition point Tg of −20° C. or higher and 70° C. or lower. This can attain sufficient scratch resistance for the recorded images and suppress disturbance in the recorded images, as well as sufficient store stability of the ink composition can be obtained. In a case where the glass transition point Tg exceeds 70° C., since the elongation at break decreases, the scratch resistance of recorded images is deteriorated. Further, since it is extremely hard as the resin to lower the close adhesion to the recording material, particularly, a recording material having a smooth surface formed with a coating layer containing fine particles on the surface such as gloss paper, it can not function as a binder to deteriorate the scratch resistance of the recorded images. In a case where the glass transition point Tg is lower than −20° C., tackiness is caused to the ink composition forming the recorded images and, in a case of recording images continuously, recorded images formed on a recording material and the succeeding recording material are adhered and a portion of the recorded images is transferred to the succeeding recording material to sometimes cause disturbance in the recorded images. Further, the store stability of the ink composition is deteriorated. Accordingly, it is defined as −20° C. or higher and 70° C. or lower.

Specific examples of the aromatic dicarboxylic acid having the metal sulfonate group contained in the polybasic carboxylic acid ingredient can include, for example, metal salts of 5-sulfoisophthalic acid, sulfoterephthalic acid, 4-sulfophthalic acid or 4-sulfonaphthalene-2,7-dicarboxylic acid but the aromatic dicarboxylic acid having the metal sulfonate group is not restricted only thereto. The metal salt can include salts of lithium (Li), sodium (Na), potassium (K), magnesium (Mg) or calcium (Ca). Among them, salt of sodium (Na) is used preferably. Among the aromatic dicarboxylic acids having the metal sulfonate group, use of the metal salt of 5-sulfoisophthalic acid is preferred and use of 5-sodium sulfoisophthalate is particularly preferred.

The aromatic dicarboxylic acid having the metal sulfonate ink is contained in the polybasic carboxylic acid ingredient by, preferably, 0.5 mol % to 8 mol % and, more preferably, 2.5 mol % to 7 mol %.

In a case where the ratio of the aromatic dicarboxylic acid having the metal sulfonate group contained in the polybasic carboxylic acid ingredient is less than 0.5 mol %, no sufficient dispersion stability to water can be obtained. In a case where it exceeds 8 mol %, the polyester resin is water solubilized and particle dispersion body in which the polyester resin is dispersed in the aqueous solution can not be obtained. Accordingly, it is defined as 0.5 mol % to 8 mol %.

The polybasic carboxylic acid ingredient may also contain aromatic dicarboxylic acids not having the metal sulfonate group, and other dicarboxylic groups such as aliphatic dicarboxylic acid or cycloaliphatic dicarboxylic acid, in addition to the aromatic dicarboxylic acid having the metal sulfonate group.

Specific examples of the aromatic dicarboxylic acid not having the metal sulfonate group can include, for example, terephthalic acid, isophthalic acid and 2,6-naphthalene carboxylic acid.

Specific examples of the aliphatic dicarboxylic acid can include, for example, saturated aliphatic dicarboxylic acids such as succinic acid, adipic acid, azelaic acid, sebacic acid, and dodecandicarboxylic acid, as well as unsaturated aliphatic dicarboxylic acid such as fumaric acid, maleic acid, and itaconic acid.

Specific examples of the cycloaliphatic dicarboxylic acids can include, for example, saturated cycloaliphatic dicarboxylic acids such as 1,4-cyclohexane dicarboxylic acid, 1,3-cyclohexane dicarboxylic acid, hexahydro ortho-phthalic acid, and tricyclodecane dicarboxylic acid, as well as unsaturated cycloaliphatic dicarboxylic acids such as tetrahydro terephthalic acid, and tetrahydro ortho-phthalic acid.

Among the dicarboxylic acids, adipic acid, sebacic acid or 1,4-cyclohexane dicarboxylic acid is used suitably.

Further, the polybasic carboxylic acid ingredient may also include, for example, tri- or higher basic polycarboxylic acids such as trimellitic acid, trimesic acid and pyromellitic acid in addition to the dicarboxylic acids described above.

The polyhydric alcohol ingredient preferably contains at least one glycol selected from the group consisting of aliphatic glycols and cycloaliphatic glycols.

Thus, since a polyester resin having a desired strength can be obtained by changing the ratio of the glycol contained in the poly-functional alcohol ingredient thereby controlling the glass transition point of the polyester resin, an ink composition suitable to the ink jet recording method capable of obtaining of high quality with less blurrs and excellent in water proofness and scratch resistance can be attained easily.

Specific examples of the aliphatic glycols can include, for example, alkylene glycols such as ethylene glycol, propylene glycol, 1,3-propanediol, 2-methyl-1,3-propanediol, 1,4-butanediol, 1,2-butanediol, 1,5-pentanediol, 2-methyl-1,5-pentanediol, 1,6-hexanediol, neopentyl glycol, 2-ethyl-2-butyl-1,3-propanediol, 1,8-octanediol, 1,9-nonanediol, 2,2,4- trimethyl-1,3-pentanediol, polyethylene glycol, polypropylene glycol, and polytetramethylene glycol, as well as ether glycols such as diethylene glycol, triethylene glycol, tetraethylene glycol and dipropylene glycol. Among them, ethylene glycol, neopentyl glycol or 1,4-butanediol is used suitably.

Specific examples of cycloaliphatic glycols can include, for example, 1,4-cyclohexanedimethanol, 1,4-cyclohexanediol, 1,3-cyclohexanedimethanol, 1,3-cyclohexanediol, 2,2-bis(4-hydroxycyclohexyl)propane, spiroglycol, tricyclodecanediol and tricyclodecanedimethanol. Among them, 1,4-cyclohexanedimethanol is used suitably.

The glycol is preferably contained by 60 mol % to 100 mol %, more preferably, 80 mol % to 100 mol % in the polyhydric alcohol ingredient. In a case where the ratio of the glycol in the polyhydric alcohol ingredient is less than 60 mol %, performance as the binder is deteriorated remarkably. Accordingly, it is defined as 60 mol % to 100 mol %. However, for providing a sufficient water proofness to the recorded images by the polyester resin, the ratio of polyethylene glycol with the molecular weight of 150 or more is preferably 20 mol % or less based on the entire polyhydric alcohol ingredient.

The polyhydric alcohol ingredient may also contain tri- or higher functional aliphatic or cycloaliphatic polyhydric alcohols in addition to the aliphatic glycols and cycloaliphatic glycols. Specific examples of tri- or higher functional aliphatic or cycloaliphatic polyhydric alcohols can include, for example, triols such as trimethylolpropane, trimethylolethane and glycerine, as well as tetraols such as pentaerythritol. The ratio of the triol and the tetraol is preferably 5 mol % or less based on the entire polyhydric alcohol ingredient in order to obtain a polyester resin of high molecular weight dispersible in water.

Further, the polyhydric alcohol ingredient may also contain aromatic polyhydric alcohols such as ethylene oxide adduct or propylene oxide adduct of 2,2-bis(4-hydroxyphenyl)propane.

The polyester resin dispersible in water can be obtained by polycondensating the polybasic carboxylic acid ingredient and polyhydric alcohol ingredient by using a known method.

The content of the polyester resin in the ink composition is, preferably, 0.5% by weight to 40% by weight and, more preferably, 0.5% to 30% by weight. In a case where the content of the polyester resin exceeds 40% by weight, viscosity of the ink composition increases out of an appropriate viscosity of the ink composition. In a case where the content of the polyester resin is less than 0.5% by weight, the effect as the binder can not be obtained. Accordingly, it is defined as 0.5% by weight to 40% by weight.

For water, water with an electroconductivity of 250 μS/cm or less is used suitably. The electroconductivity of the water depends on the amount of ion ingredients contained, and the amount of necessary ion ingredients contained in water with an electroconductivity of 250 μS/cm or less is small and the water purity is high. In a case where the amount of the necessary ion ingredient contained in water increases and the electroconductivity exceeds 250 μS/cm, since the sulfonic group of the polyester resin formed by the dissociation of the metal ion tends to be bonded with the ion ingredient, the polyester resin can not be dispersed stably in the ink composition. Accordingly, it is defined as 250 μS/cm or less.

The water content in the ink composition is, preferably, 30% by weight to 95% by weight and, more preferably, 30% by weight to 65% by weight. In a case where the water content exceeds 95% by weight, the wettability of the ink composition can no more be maintained. In a case where the water content is less than 30% by weight, the mixing stability of hydrophilic additive or the like can not be maintained. Accordingly, it is defined as 30% by weight to 95% by weight.

For the reproduction of each color in the full color ink jet recording method, ink compositions for three colors of cyan (simply referred to as C), magenta (simply referred to as M) and yellow (simply referred to as Y) are used and respective colors are expressed by mixing the color of the ink compositions. However, since black color is difficult to be reproduced by mixing of the three colors, an ink composition of black (simply referred to as B) is generally used for the expression of the black color. An ink composition of cyan, magenta, yellow or black can be obtained by changing the color of the colorant used.

For the colorant, dye, pigment or a mixture thereof is used. The dye and the pigment may be those materials in which they are contained or on which they are deposited. Particularly, since the use of a pigment-containing ink composition can provide recorded images of excellent light fastness and water proofness, the colorant preferably contains the pigment.

In this embodiment, a pigment having one or more hydrophilic groups selected from the group consisting, for example, of carboxylic group, hydroxyl group, amino group and sulfonic group is used for the colorant. The hydrophilic group is introduced by a method, for example, of applying chemical modification or covering the hydrophilic polymer to the surface of the pigment. Further, the hydrophilic group may be in the form of a salt.

Usually, it is difficult to stably disperse a pigment in a water-containing ink composition but, since the pigment used for the ink composition in this embodiment has a hydrophilic group, it is dispersed stably. Further, since the ink composition of this embodiment contains the water dispersible polyester resin as described above, the pigment can be dispersed more stably. Accordingly, since occurrence of clog can be suppressed, a ink composition capable of obtaining recorded images of excellent light fastness and water proofness can be obtained without deteriorating the discharging stability.

Particularly, since the dispersion stability of the pigment in the ink composition can be further improved due to the presence of the carboxylic group or the sulfonic group to the pigment, it is preferred that the pigment has at least one of the hydrophilic groups of the carboxyl group and the sulfonic group.

Specific examples of the pigment can include the pigments described below but the pigment is not restricted to them. The pigments are to be indicated by color index (simply referred to as C.I.) numbers.

The pigment used for the cyan ink composition can include, for example, C.I. pigment blue 1, 2, 15, 16, 17, 21, 22, 60 and 64.

The pigment used for the magenta ink composition can include, for example, C.I. pigment red 2, 3, 5, 16, 23, 31, 49, 57, 63, 122, and 209, as well as C.I. pigment violet 19.

The pigment used for the yellow ink composition can include, C.I. pigment yellow 1, 2, 3, 5, 12, 74, 138, 150, and 180.

The pigment used for the black ink composition can include, the carbon black such as channel black, furnace black, thermal black and lamp black.

Among the pigments, at least one of pigments of C.I. pigment blue 15:3 and C.I. pigment blue 15:4 is used preferably for the cyan ink composition. Further, at least one of pigments selected from the group consisting of C.I. pigment red 122, C.I. pigment red 209 and C.I. pigment violet 19 is used preferably for the magenta ink composition. Further, at least one of pigments selected from the group consisting of C.I. pigment yellow 74, C.I. pigment yellow 138, C.I. pigment yellow 150, and C.I. pigment yellow 180 is used preferably for the yellow ink composition. Further at least one of pigments selected from the carbon blacks described above is used preferably for the black ink composition. By the use of the pigments, an ink composition capable of attaining recorded images of excellent developability for each of the colors can be obtained.

Further, dense black recorded images at a concentration near the recorded images formed by using a black ink composition can be attained by superposing ink compositions for three colors comprising a cyan ink composition using at least one of pigments of C.I. pigment blue 15:3 and C.I. pigment blue 15:4, a magenta ink composition using at least one of pigments selected from the group consisting of C.I. pigment red 122, C.I. pigment red 209 and C.I. pigment violet 19, and a yellow ink composition using at least one of pigments selected from the group consisting of C.I. pigment yellow 74, C.I. pigment yellow 138, C.I. pigment yellow 150, and C.I. pigment yellow 180.

Accordingly, an ink set having favorable black color reproducibility and excellent in the color balance can be obtained to attain full color recorded images of excellent color developability by combining ink compositions for three colors comprising a cyan ink composition using at least one of pigments of C.I. pigment blue 15:3 and C.I. pigment blue 15:4, a magenta ink composition using at least one of pigments selected from the group consisting of C.I. pigment red 122, C.I. pigment red 209 and C.I. pigment violet 19, and a yellow ink composition using at least one of pigments selected from the group consisting of C.I. pigment yellow 74, C.I. pigment yellow 138, C.I. pigment yellow 150, and C.I. pigment yellow 180, or by combining ink compositions for four colors further adding a black ink composition to the ink compositions for the three colors.

The content of the pigment in the ink composition has no particular restriction and it is, preferably, from 0.1 to 10% by weight.

For the dyes, water-soluble dyes such as acid dye, direct dye, reactive dye and food pigments can be used suitably. Among them, use of those having excellent water proofness, light fastness or stability are used preferably.

While the following dyes can be mentioned as specific examples of the dyes, the dye is not restricted thereto. The dyes are hereinafter indicated by color index (C.I.) numbers.

The dyes used for the cyan ink composition can include, for example acid dyes such as C.I. acid blue 7, 9, 29, 45, 92 and 249, direct dyes such as C.I. direct blue 1, 2, 6, 15, 22, 25, 71, 76, 79, 86, 90 98, 163, 165, 199 and 202, as well as reactive dyes such as C.I. reactive blue 1, 2, 7, 14, 15, 23, 32, 38, 41, 63, 80, and 95. Among them, at least one of dyes selected from the group consisting of C.I. acid blue 7 and 9, as well as C.I. direct blue 199 are used preferably.

The dyes used for the magenta ink composition can include, for examples acid dyes such as C.I. acid red 1, 8, 13, 14, 18, 26, 27, 35, 37, 42, 52, 82, 87, 89, 92, 97, 106, 111, 114, 115, 134, 186, 249, 254, and 289 direct dyes such as C.I. direct red 1, 4, 9, 13, 17, 20, 28, 31, 39, 80, 81, 83, 89, 225, and 227, and C.I. direct orange 26, 29, 62, and 102, as well as reactive dyes such as C.I. reactive red 1, 14, 17, 25, 26, 32, 37, 44, 46, 55, 58, 60, 66, 74, 79, 96, 97, 141, 147, 180, and 181. Among them, at least one of dyes selected from the group consisting of C.I. acid red 52 and 289, as well as C.I. reactive red 58, 141, and 180 is used preferably.

The dyes used for the yellow ink composition can include, for example acid dyes such as C.I. acid yellow 1, 7, 17, 23, 42, 44, 79, and 142, direct dyes such as C.I. direct yellow 1, 12, 24, 26, 33, 44, 50, 86, 120, 132, 142, and 144, and as well as reactive dyes such as C.I. reactive yellow 1, 5, 11, 13, 14, 20, 21, 22, 25, 40, 47, 51, 55, 65, and 67. Among them, at least one of dyes selected from the group consisting of C.I. acid yellow 17 and 23, as well as C.I. direct yellow 86 are used preferably.

The dyes used for the black ink composition can include, for example, food pigments such as C.I. food black 2, direct dyes such as C.I. direct black 19, 22, 32, 38, 51, 56, 71, 74, 75, 77, 154, 168, and 171, as well as reactive dyes such as C.I. reactive black 3, 4, 7, 11, 12 and 17. Among them, at least one of dyes selected from the group consisting of C.I. food black 2 and C.I. direct black 154 are used preferably.

The dyes described above are used within a range dissolving stably at a normal temperature. Since the range is different on every dyes, the content of the dye in the ink composition has no particular restriction and it is preferably from 0.1 to 10% by weight.

The ink composition in this embodiment preferably contains a nonionic surfactant at a critical micelle concentration or more.

Since the nonionic surfactant is not ionized in an aqueous solution, the dispersion stability of the polyester resin provided by the metal sulfonate group is not deteriorated. Further, while the surface tension of a solution containing a surfactant lowers along with increase of the surfactant up to the critical micelle concentration, since it is substantially constant at the critical micelle concentration or more, the effect of the nonionic surfactant can be attained sufficiently to lower the surface tension of the composition sufficiently by incorporation of the nonionic surfactant at the critical micelle concentration or more as described above. Accordingly, since the wettability between the ink composition and the inner wall of an ink chamber in the recording apparatus in a case of use for the ink jet recording method without deteriorating the dispersion stability of the polyester resin and the ink composition can be supplied stably to the ink chamber, the discharge stability can be improved.

Further, for providing the effect of the nonionic surfactant sufficiently, it is preferred to use water with less impurities. In a case where a great amount of impurities are contained in water, since the nonionic surfactant acts to surround the impurities, it can not provide the effect sufficiently. However, since water at high purity with the electroconductivity of 250 μS/cm or less is used as described above in this embodiment, the nonionic surfactant can provide the effect sufficiently.

Specific examples of the nonionic surfactant can include those surfactants represented by the following general formulae (I), (II), (III), (IV) or (V), but the nonionic surfactant is not restricted to them.

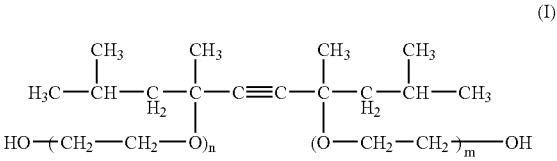
(I)

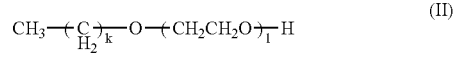
(II)

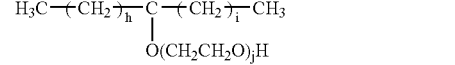
(III)

-continued

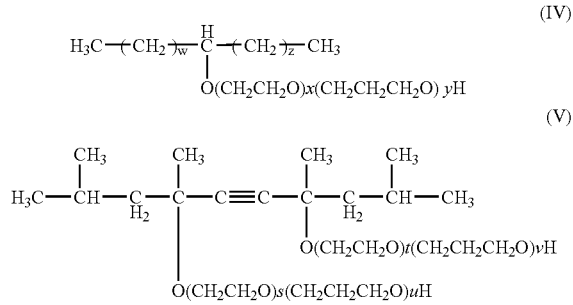

In the general formula (I), m represents an integer or decimal from 0 to 30 and n represents an integer or decimal from 0 to 30. Further, the sum of m and n (m+n) is an integer or decimal from 0 to 30.

In the general formula (II), k represents an integer or decimal from 11 to 13 and l represents an integer or decimal from 3 to 30.

In the general formula (III), h represents an integer or decimal from 0 to 11, i represents an integer or decimal from 0 to 11, and j represents an integer or decimal from 3 to 50. Further, the sum of h and i (h+i) is an integer or decimal from 9 to 11.

In the general formula (IV), w represents an integer or decimal from 0 to 11, x represents an integer or decimal from 5 to 9, y represents an integer or decimal from 2.5 to 5, and z represents an integer or decimal from 0 to 9. Further, the sum of w and z (w+z) is an integer or decimal from 9 to 11.

In the general formula (V), the sum of s and t (s+t) is an integer or decimal from 1 to 30, and the sum of u and v (u+v) is an integer or decimal from 1 to 10.

The critical micelle concentration of the nonionic surfactant is about from 0.001% by weight and 0.1% by weight (measuring temperature: 25° C.).

Further, the ink composition in this embodiment may also contain an organic solvent and it preferably contains a water-soluble organic solvent having a vapor pressure lower than the vapor pressure of the water. This can suppress drying to improve the discharge stability.

Specific examples of the organic solvent can include, for example, amides such as dimethyl formamide and dimethyl acetoamide, polyhydric alcohols such as polyethylene glycol, polypropylene glycol, ethylene glycol, diethylene glycol, thiodiglycol, propylene glycol, triethylene glycol, 1,5-pentanediol, 1,4-butanediol, 1,3-propanediol, 1,2-hexanediol, glycerine and 1,2,6-hexanetriol, polyhydric alcohol ethers, for example, glycol ethers such as ethylene glycol monomethyl ether, ethylene glycol monobutyl ether, diethylene glycol monomethyl ether, diethylene glycol monoethyl ether, triethylene glycol monobutyl ether, propylene glycol monoethyl ether, tetraethylene glycol monomethyl ether, and ethylene glycol monophenyl ether, sulfur-containing compounds such as sulfolane and dimethylsulfoxide, nitrogen-containing compounds such as 2-pyrrolydone, N-methylpyrrolidone, and ε-caprolactam, oxygen-containing compound such as γ-butyrolactone, as well as poly-functional compounds such as dimethylamino ethanol, diethylamino ethanol, triethanolamine and morpholine, but the organic solvent is not restricted to them.

Among the organic solvent described above, glycol ethers and polyhydric alcohols which are water soluble organic solvents having vapor pressure lower than the vapor pressure of the water are preferably used. The discharge stability can be improved further by incorporation of glycol ether and/or polyhydric alcohols. Among the glycol ethers, diethylene glycol monobutyl ether or triethylene glycol monobutyl ether is used preferably. Further, among the polyhydric alcohol, glycerine, 1,2-hexanediol or 1,5-pentanediol is used preferably.

The organic solvents described above are used within a range from 1 to 70% by weight, more preferably, within a range from 1 to 40% by weight based on the entire weight of the ink composition. In a case where the amount of the organic solvent used exceeds 70% by weight and the ratio of the water in the composition is lowered, blurrs are caused on recorded medium such as paper, and drying property is remarkably deteriorated. In addition, the viscosity of the ink composition increases out of an appropriate range, and liquid droplets of the ink composition can not be discharged stably in a case of use for the ink jet recording method.

Further, the ink composition of this embodiment may also contain, in addition to water, colorant, polyester resin, nonionic surfactant and organic solvent described above, other additives, for example, an anti-molding agent, a pH controller, a chelating agent, a lust inhibitor or a UV absorbent.

For the anti-mold agent, sodium dehydro acetate, sodium benzoate or sodium sorbate, etc. can be used suitably.

For the pH controller, triethanolamine, sodium hydroxide, sodium carbonate, sodium nitrate or potassium nitrate is used preferably.

The viscosity of the ink composition of this embodiment containing at least water, colorant and polyester resin is preferably 20 mPa·s or less and, more preferably, 15 mPa·s or less. In a case where the viscosity of the ink composition exceeds 20 mPa·s, liquid droplets of the ink composition can not be discharged stably in a case of user for the ink jet recording method. Accordingly, it is defined as 20 mPa·s or less.

Further, the surface tension is, preferably, from 20 to 60 mN/m, more preferably, 20 to 50 mN/m. In a case where the surface tension is less than 20 mN/m, since the penetration property is excessively high, the ink composition diffuses laterally on an absorptive recorded material to make the contour of the formed recorded images obscure. Further, in a case where the surface tension exceeds 60 mN/m, since the penetration property of the recorded material is lowered, the drying property is deteriorated. Further, wettability between the composition and the inner wall of an ink chamber is worsened to stagnate supply of the ink composition to the ink chamber and the ink composition is less filled in the ink chamber, so that the liquid droplets of the ink composition can not be discharged stably. Accordingly, it is defined as 20 to 60 mN/m.

Figure 2:
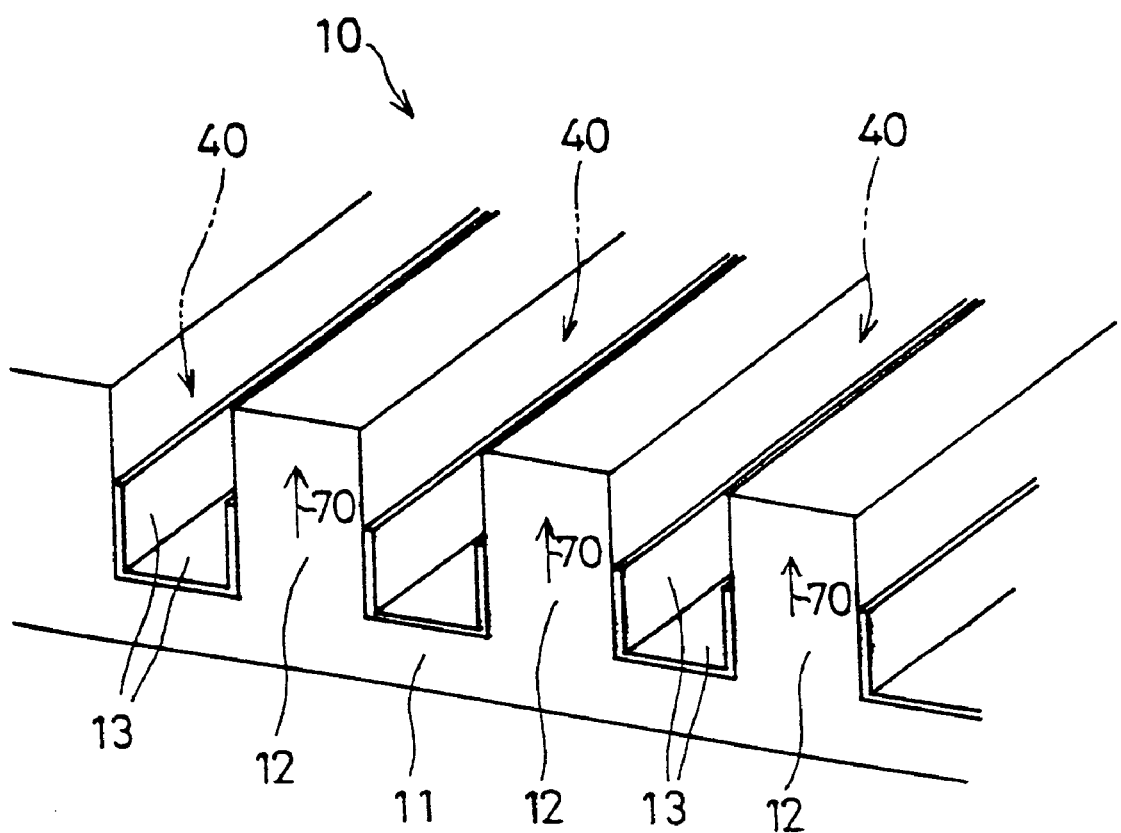
FIG. 2 is an enlarged view of a portion for the constitution of a head plate constituting an ink head shown in FIG. 1.

FIG. 1 is an exploded perspective view schematically showing the constitution of an ink head 1 as a second embodiment of the invention and FIG. 2 is an enlarged view of a portion for the constitution of a head plate 10 constituting the head 1 shown in FIG. 1. In FIG. 1, a driving electrode 13 shown in FIG. 2 is not illustrated since this complicates the drawing making it difficult for understanding.

The ink head 1 comprises a head plate 10 having a bottom wall 11 formed of a piezoelectric material and a plurality of partition wall portions 12, a top plate 20 disposed to the upper surface of the partition wall portions 12, a nozzle plate 30 having a plurality of discharge ports 31 and disposed at one end of the partition wall portions 12, a not illustrated back plate disposed to the other end of the partition wall portions 12 and an ink tank 50 disposed above the top plate 20 and having an opening 51. The plurality of partition wall portions 12 are arranged in parallel with each other each at a predetermined distance on the bottom wall 11, and the plurality of partition wall portions 12, the bottom wall 11, the top plate 20, the nozzle plate 30 and the not illustrated back plate constitute a plurality of ink chambers 40. The top plate 20 has a common ink supply channel 21 in communication with each of the ink chambers 40 and an ink supply pipe 22 connecting the common ink supply channel 21 and the opening 51 of the ink tank 50. The ink tank 50 stores an ink composition 60 of the first embodiment and the ink composition 60 is supplied by way of the common ink supply channel 21 to each of the ink chamber 40.

Further, as shown in FIG. 2, driving electrodes 13 for applying a voltage to the plurality of the partition wall portions 12 are formed on the bottom wall 11 and the surfaces of the plurality of partition wall portions 12 facing the ink chambers 40 of the head plate 10 for applying a voltage to the plurality of the partition wall portions 12. Further, the piezoelectric material forming the plurality of partition wall portions 12 is polarized each in the direction of an arrow 70 and the plurality of partition wall portions 12 function as piezoelectric elements.

The thus constituted ink head 1 is a piezoelectric type ink head capable of discharging liquid droplets of the ink composition 60 from the discharge port 31 in accordance with the voltage applied to the plurality of the partition wall portions 12 as the piezoelectric elements.

Figure 3:
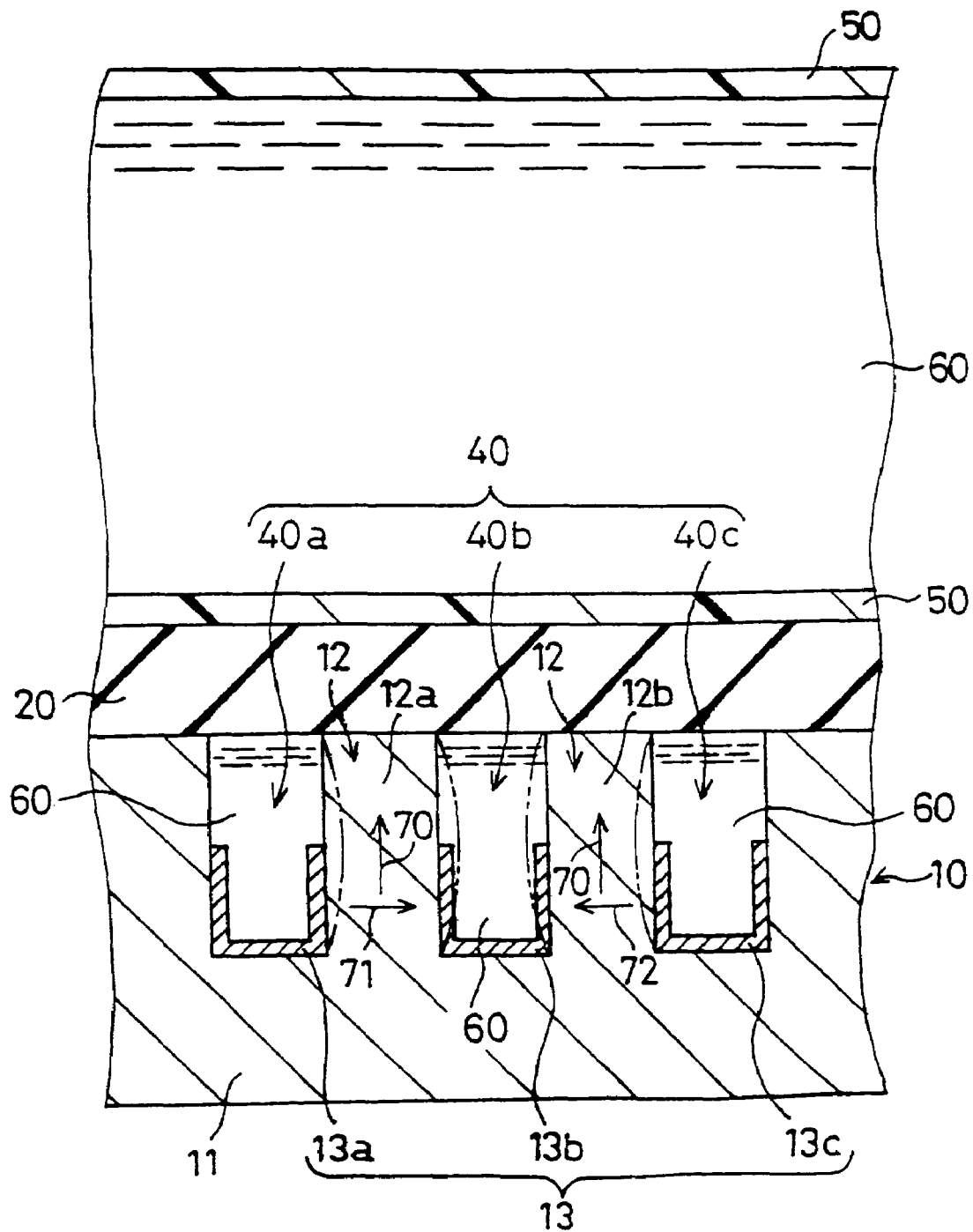
FIG. 3 is a cross sectional view of the ink head shown in FIG. 1 in the extending direction of an ink chamber.

Description is to be made to the operation principle when the ink composition 60 is discharged from the ink chamber 40 in the ink head 1. FIG. 3 is a cross sectional view of the ink head 1 shown in FIG. 1 as viewed from the extending direction of the ink chamber 40. Here, description is to be made to the operation when the ink composition 60 is discharged from ink chamber 40b.

When a voltage is not applied to the partition wall portions 12a and 12b constituting the ink chamber 40b, that is, when there is no potential difference formed between a driving electrode 13b of the ink chamber 40b and a driving electrode 13a of the ink chamber 40a adjacent with the ink chamber 40b, and between the driving electrode 13b of the ink chamber 40b and the driving electrode 13c of the ink chamber 40c adjacent with the ink chamber 40b, the ink chamber 40b is in a state filled with the ink composition 60 supplied from the ink tank 50 by a capillary function. In the same manner, also the ink chambers 40a and 40c are in a state filled with the ink composition 60.

When a voltage is applied to the driving electrode 13a and the driving electrode 13c, a potential difference is formed between driving electrode 13b and the driving electrode 13a and the between the driving electrode 13b and the driving electrode 13c in which a voltage is applied to the partition wall portions 12a and 12b constituting the ink chamber 40b. The voltage generates an electric field in the partition wall portions 12a and 12b in the direction of arrows 71 and 72, respectively. Under the effect of the electric field, distortion is caused to the partition wall portions 12a and 12b constituting the ink chamber 40b, by which they are deformed so as to be in a convex shape toward the ink chamber 40b. Thus, pressure waves are generated to exert a large pressure on the ink composition 60 filled in the ink chamber 40b to discharge the liquid droplets of the ink composition 60 from the discharge port 31 shown in FIG. 1 described above.

When a the application of the voltage to the driving electrode 13a and the driving electrode 13c is stopped, the partition wall portions 12a and 12b restore the original shape and the ink chamber 40b recovers the original volume by which the ink composition 60 is supplied by the recovered volume by way of the common ink supply channel 21 shown in FIG. 1 from the ink tank 50, and the ink chamber 40b restores the initial state filled with the ink composition 60.

In the ink head 1 according to this embodiment, since the ink composition 60 of the first embodiment is stored in the ink tank 50 as described above, and the ink composition 60 is supplied to the ink chamber 40 and discharged as liquid droplets from the discharge port 31, the liquid droplets of the ink composition 60 can be discharged stably from the discharge port 31 to provide recorded images of high quality with less blurrs and excellent in water proofness and scratch resistance. By the use of such an ink head, a piezoelectric type ink jet recording apparatus of high reliability can be attained and recorded images of high quality can be obtained stably.

In this embodiment, the partition wall portions 12 constituting the ink chamber 40 are formed of the piezoelectric material and operated as the piezoelectric element but this is not restrictive and the partition wall constituting the ink chamber may be formed of the material other than the piezoelectric material, and a piezoelectric element may be disposed inward and outward of the partition wall.

Figure 4:
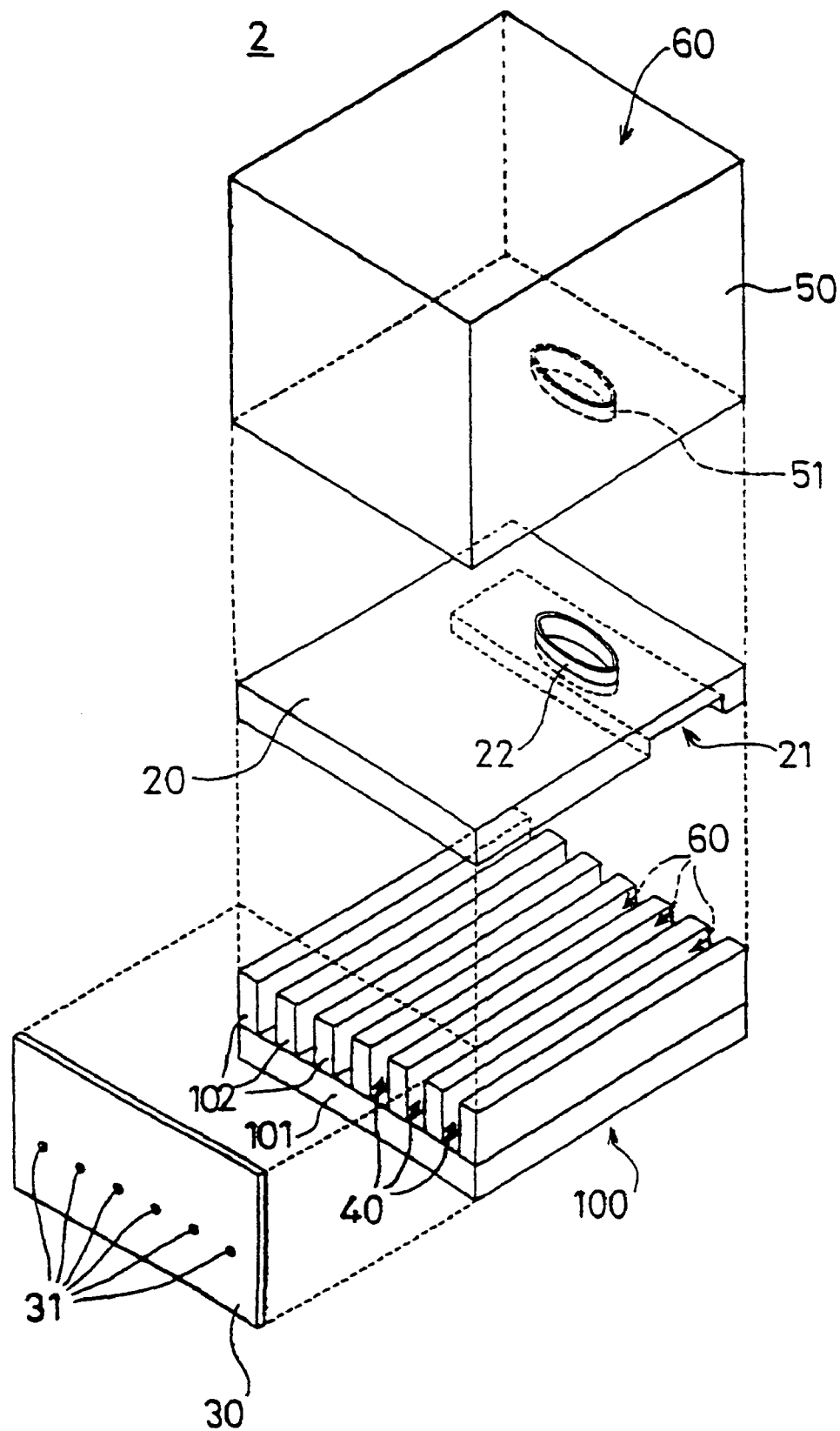
FIG. 4 is an exploded perspective view for the schematic constitution of an ink head as a third embodiment of the invention.
Figure 5:
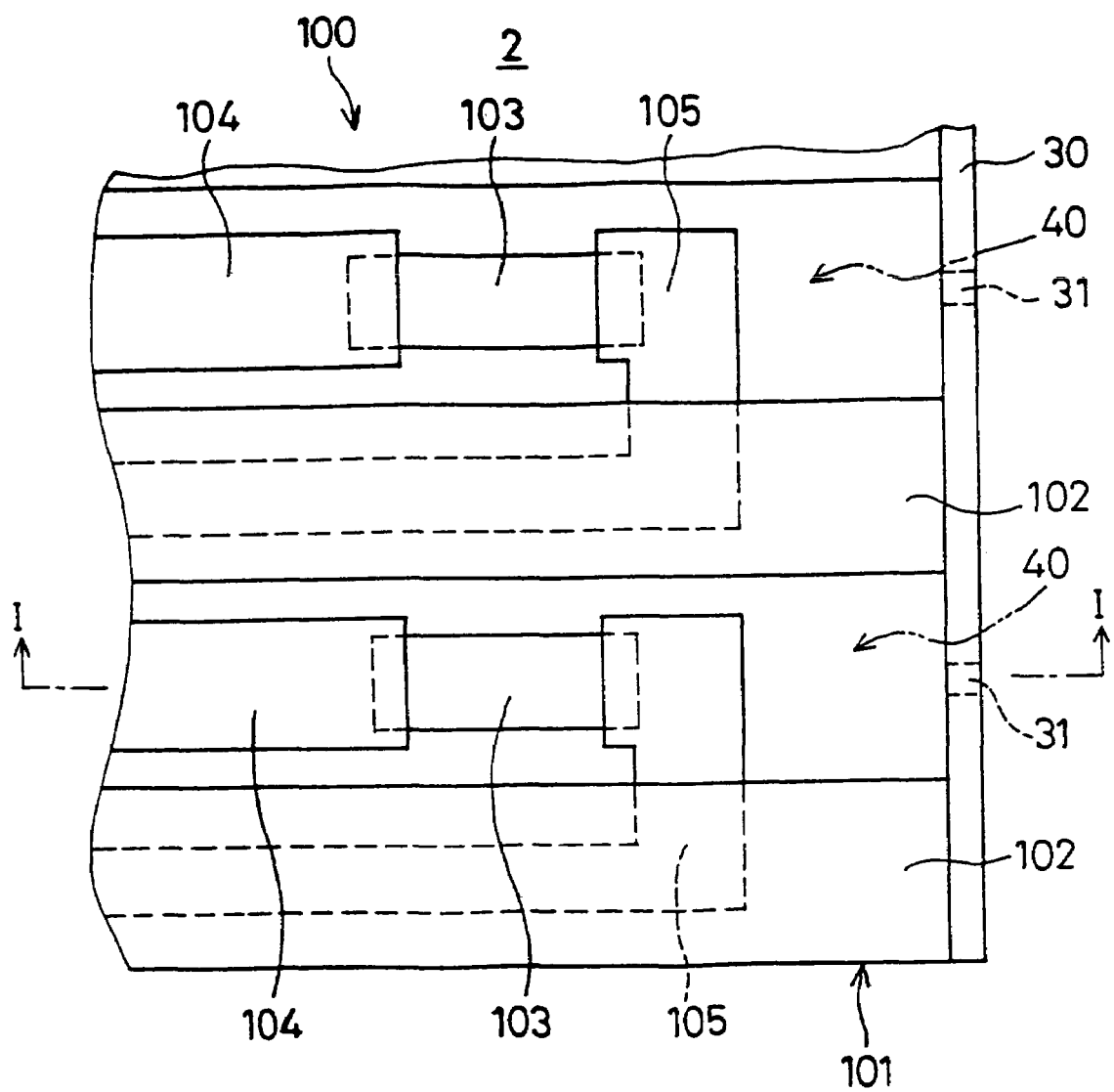
FIG. 5 is a plan view of a portion for the constitution of the ink head shown in FIG. 4.

FIG. 4 is an exploded perspective view schematically showing the constitution of an ink head 2 as a third embodiment of the invention and FIG. 5 is a plan view showing a portion for the constitution of the ink head 2 shown in FIG. 4. In FIG. 5, the top plate 20 and the ink tank 50 showing in FIG. 4 are not illustrated since they complicate the drawing making it difficult for understanding. The ink head 2 of this embodiment is similar to the ink head 1 of the second embodiment and corresponding portions carry identical reference numerals, for which explanations are to be omitted.

It is to be noted that a head plate 100 comprises a substrate 101, a plurality of partition walls 102 disposed in parallel with each other at a predetermined distance on the substrate 101, a heater 103 as a heat generation body disposed on the surface of the substrate 101 facing the ink chamber 40, and driving electrodes 104 and 105 for applying a voltage to the heater 103.

The thus constituted ink head 2 is a thermal ink jet type ink head capable of discharging liquid droplets of the ink compositions 60 from the discharge port 31 in accordance with the voltage applied to the heater 103 as a heat generation body.

Figure 6:
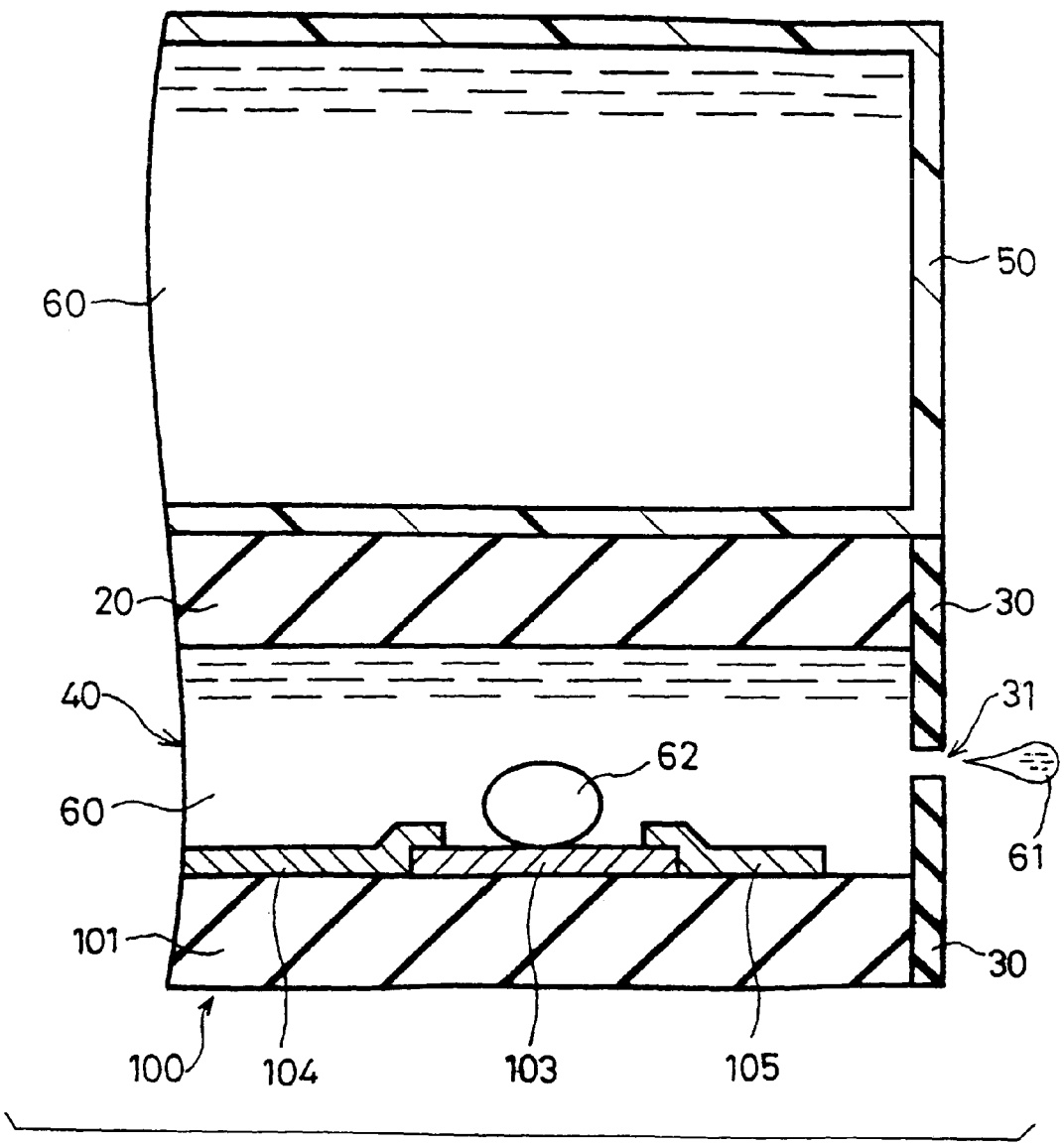
FIG. 6 is a view showing the state of discharging a liquid droplet of an ink composition from an ink chamber.

The operation principle is to be described upon discharging the ink composition 60 from the ink chamber 40 in the ink head 2. FIG. 6 is a view showing the state of discharging liquid droplets 61 of the ink composition 60 from the ink chamber 40. FIG. 6 shows a cross sectional constitution of the ink head 2 shown in FIG. 5 along the cross sectional line I-I.

In a case where voltage is not applied to the heater 103, the ink chamber 40 is in a state filled with the ink composition 60 like the case of the ink head 1 of the second embodiment in which the voltage is not applied to the partition wall portion 12.

When a voltage is applied by the driving electrode 104 and 105 to the heater 103, the heater 103 generates heat, by which the ink composition 60 filled in the ink chamber 40 is heated to evolve air bubbles 62. This generates pressure waves to exert a large pressure on the ink composition 60 filled in the ink chamber 40, which discharges the liquid droplets 61 of the ink composition 60 out of the discharge port 31.

When the application of the voltage to the heater 103 is stopped, the ink composition 60 in the ink chamber 40 is cooled and air bubbles 62 are eliminated in which the ink composition 60 is supplied by the restored volume from the ink tank 50 by way of the common ink supply channel 21 shown in FIG. 4 and the ink chamber 40 returns to the initial state filled with the ink composition 60.

Since the ink head 2 according to this embodiment, like the ink head 1 of the second embodiment described above, stores the ink composition 60 of the first embodiment in the ink tank 50 and the ink composition 60 is supplied to the ink tank 40 and discharged as the liquid droplets 61 from the discharge port 31, the liquid droplet 61 of the ink composition 60 can be discharged stably from the discharge port 31 to provide recorded images of high quality with less blurrs and excellent in water proofness and scratch resistance. By the use of the ink head described above, a thermal ink jet type ink jet recording apparatus of high reliability can be attained and recorded images of high quality can be obtained stably.

EXAMPLE

The present invention is to be described further in details by way of examples but the invention is not restricted thereto. In this example, image recording is sometimes referred to also as printing.

(Polyester Resins 1 to 8)

Upon preparation of polyester resins, polyester resins 1 to 7 in which the polybasic carboxylic acid ingredient contains an aromatic dicarboxylic acid having a metal sulfonate group, and a polyester resin 8 in which the polybasic carboxylic acid ingredient does not contain the aromatic dicarboxylic acid having the metal sulfonate group were obtained by changing the kind of the polybasic carboxylic acid ingredient and the ratio (mol %) thereof in the polybasic carboxylic acid ingredient, and the kind of the polyhydric alcohol ingredient and the ratio (mol %) thereof in the polyhydric alcohol ingredient as shown in Table 1. In Table 1, the polyester resins is abbreviated as PES.

For the obtained polyester resins 1 to 8, the number average molecular weight and the glass transition point Tg were measured. Table 1 shows the result of measurement. The number average molecular weight and the glass transition point Tg were measured as described below.

<Number Average Molecular Weight>

0.03 g of a specimen was dissolved in 10 ml of tetrahydrofuran and put to gel permeation chromatography (GPC) to determine the number average molecular weight. HLC8120 manufactured by Toso Co was used for the apparatus and three columns of Shodex KF-802, 804, and 806 manufactured by Showa Denko Co. were used. The flow rate was set to 1.0 ml/min and the measuring temperature was set at 30° C. A molecular weight calibration curve was prepared by using a standard polystyrene.

<Glass Transition Point>

3 g of a specimen was weighted and put to differential scanning calorimetry by using a differential scanning calorimeter (DSC 200, manufactured by Seiko Denshi Kogyo Co.) in accordance with JIS K 7121-1987, at a temperature elevation rate of 20° C./min. A temperature at an intersection between a straight line extended from a base line of a resultant DSC curve on the low temperature side toward the high temperature side and a tangential line drawn at a curve for the stepwise changing portion of glass transition where the slope was at the maximum was determined and defined as the glass transition point.

Further, water dispersibility of the obtained polyester resins 1 to 8 was evaluated as shown below.

<Water Dispersibility>

After putting 10 g of a specimen into 990 g of water and, stirring by a three-one motor, stood still at 40° C. for 2000 hours. The dispersed state after standing still was visually observed and evaluated as good (O) in a case where the specimen was dispersed homogeneously with no precipitation, as favorable (Δ) in a case where a portion of the specimen was precipitated, and as failed (x) in a case where the specimen was precipitated and separated from water. The result of the evaluation is shown in Table 1.

TABLE 1

| | Polybasic carboxylic acid ingredient | | Polyhydric alcohol ingredient | | Molecular weight (×10³) | Glass transition point (° C.) | Water dispersibility |
|---|---|---|---|---|---|---|---|
| PES1 | 5-sodium isophthalate | 4 mol % | Ethylene glycol | 48 mol % | 20 | 65 | o |
| | Terephthalic acid | 47 mol % | Neopentyl glycol | 52 mol % | | | |
| | Isophthalic acid | 49 mol % | | | | | |
| PES2 | 5-sodium isophthalate | 3 mol % | Ethylene glycol | 40 mol % | 25 | −10 | o |
| | Terephthalic acid | 70 mol % | 1,4-butanediol | 60 mol % | | | |
| | Isophthalic acid | 27 mol % | | | | | |
| PES3 | 5-sodium isophthalate | 5 mol % | Ethylene glycol | 65 mol % | 29 | 10 | o |
| | Terephthalic acid | 70 mol % | Neopentyl glycol | 35 mol % | | | |
| | Sebacic acid | 25 mol % | | | | | |
| PES4 | 5-sodium isophthalate | 5 mol % | Ethylene glycol | 40 mol % | 20 | 5 | o |
| | Terephthalic acid | 65 mol % | Diethylene glycol | 60 mol % | | | |
| | Isophthalic acid | 5 mol % | | | | | |
| | Sebacic acid | 25 mol % | | | | | |
| PES5 | 5-sodium isophthalate | 5 mol % | Ethylene glycol | 65 mol % | 20 | 45 | o |
| | Terephthalic acid | 55 mol % | Neopentyl glycol | 35 mol % | | | |
| | 1,4-cyclohexane dicarboxylic acid | 40 mol % | | | | | |
| PES6 | 5-sodium isophthalate | 3.5 mol % | Neopentyl glycol | 55 mol % | 23 | 71 | o |
| | Terephthalic acid | 50.5 mol % | 1,4-cyclohexane dimethanol | 45 mol % | | | |
| | Isophthalic acid | 26 mol % | | | | | |
| | 2,6-naphthalene dicarboxylic acid | 20 mol % | | | | | |
| PES7 | 5-sodium isophthalate | 4 mol % | Ethylene glycol | 80 mol % | 51 | 60 | Δ |
| | Terephthalic acid | 49 mol % | Diethylene glycol | 20 mol % | | | |
| | Isophthalic acid | 49 mol % | | | | | |
| PES8 | Terephthalic acid | 50 mol % | Ethylene glycol | 55 mol % | 23 | 57 | x |
| | Isophthalic acid | 50 mol % | Neopentyl glycol | 45 mol % | | | |

The polyester resins 1-7 (PES 1-7) in which the polybasic carboxylic acid ingredient contained the aromatic dicarboxylic acid having the metal sulfonate group could be dispersed water. The polyester resin 7 having the molecular weight in excess of 50,000 showed somewhat poor water dispersibility.

On the other hand, the polyester resin 8 (PES8) in which the polybasic carboxylic acid ingredient did not contain the aromatic dicarboxylic acid having the metal sulfonate group could not be dispersed in water.

As described above, water dispersible polyester resins could be obtained in a case where the polybasic carboxylic acid ingredient contained-the aromatic dicarboxylic acid having the metal-sulfonate group.

Ink compositions were manufactured as described below by using the obtained polyester resins 1 to 7.

Examples 1 to 10 and Comparative Example 1

Ink compositions of Examples 1 to 10 containing polyester resins capable of satisfying the necessary conditions of the invention, namely, polyester resins in which the basic carboxylic acid ingredient contained aromatic dicarboxylic acid having metal sulfonate group, and an ink composition of comparative example 1 not satisfying the necessary conditions of the invention, namely, not containing a polyester resin in which the polybasic carboxylic acid ingredient contained the aromatic dicarboxylic acid having the metal sulfonate group were obtained by changing the kind and the content of the colorant, organic solvent, surfactant, polyester resin and water upon manufacture of the ink composition. In Table 2, the unit for the values in each of columns is on the parts by weight, and the total amount for each of the ink composition of Examples 1 to 10 and Comparative Example 1 is 100 parts by weight. Further, in Table 2, TEGBE represents triethylene glycol monobutyl ether and PEG 400 represents a polyethylene glycol having a molecular weight of 400.

TABLE 2

| Composition | Example 1 | 2 | 3 | 4 | 5 | 6 | 7 | 8 | 9 | 10 | Comp. Ex 1 |
|---|---|---|---|---|---|---|---|---|---|---|---|
| Colorant | | | | | | | | | | | |
| Dye | | | | | | | | | | | |
| C.I. direct blue 199 | 3 | | | | | | | | | | |
| Pigment | | | | | | | | | | | |
| C.I. pigment blue 15:3 | | 3 | | | | | | | | | |
| C.I. pigment blue 15:4 | | | 3 | | | | | | | | |
| C.I. pigment red 122 | | | | 5 | | | | | | | |
| C.I. pigment yellow 74 | | | | | 4 | | | | | | |
| C.I. pigment yellow 180 | | | | | | 4 | | | | | |
| Carbon black | | | | | | | 5 | | | | 5 |
| C.I. pigment blue 17 | | | | | | | | 2 | | | |
| C.I. pigment red 58 | | | | | | | | | 3 | | |
| C.I. pigment yellow 13 | | | | | | | | | | 2 | |
| Organic solvent | | | | | | | | | | | |
| Diethylene glycol | 8 | 8 | 8 | 8 | 8 | 8 | 8 | 2 | 5 | 8 | 10 |
| Glycerine | 7 | 7 | 7 | 7 | 7 | 7 | 7 | 5 | 5 | 17 | 10 |
| 1,2-hexanediol | | | 2 | 5 | 2 | 2 | 5 | | 2 | 18 | 5 |
| TEGBE | 8 | 8 | 8 | 5 | 5 | 3 | 6 | | 4 | | 8 |
| PEG400 | | | | | | | | 10 | 15 | 15 | 10 |
| Surfactant | | | | | | | | | | | |
| General formula (I) ($m + n = 10$) | | 1 | | 0.5 | 1 | | | 1 | | | 0.5 |
| General formula (II) ($k = 11-13, l = 15$) | 1 | | | | | 1.0 | | | 1.5 | | |
| General formula (III) ($h + i = 9-11, j = 9$) | | | 0.5 | 0.5 | | | | | | 1 | 0.5 |
| General formula (IV) ($w + z = 9-11$, $x = 9, y = 5$) | | | | | | | 1.0 | | | | |
| Polyester resin | | | | | | | | | | | |
| PES1 | 1 | | | | | | | 1 | | | none |
| PES2 | | 1.5 | | | | 2 | | | | | |
| PES3 | | | 1.2 | | | | | 2.5 | | | |
| PES4 | | | | 2 | | | | | | | |
| PES5 | | | | | 2.5 | | | | | | |
| PES6 | | | | | | | | | | 1.5 | |
| PES7 | | | | | | | | | 1 | | |
| Water | | | | | | | | | | | |
| Content | Balance | Balance | Balance | Balance | Balance | Balance | Balance | Balance | Balance | Balance | Balance |
| Electroconductivity (μS/cm) | 150 | 250 | 10 | 250 | 10 | 1 | 0.5 | 4.0 | 3.0 | 290 | 200 |

Characteristics were evaluated as shown below for each of the compositions of Examples 1 to 10 and Comparative Example 1 obtained.

(Evaluation 1) Scratch Resistance

By using each of the obtained compositions of Examples 1 to 7 and Comparative Example 1 thus, predetermined color bars were printed to form images for evaluation on gloss paper manufactured by Sharp Corp. (Photo gloss paper, trade name of products: product No.: AJ-K4AG) by using an ink jet recording apparatus obtained by modifying a commercially available ink jet recording apparatus (AJ2000, manufactured by Sharp Corp.). After leaving the images for evaluation for one day and drying them sufficiently, the printed density (%) of the images for evaluation was measured by using an optical densitometer (X-Rite 938, manufactured by X-Rite Co.). After bringing a plastic eraser on the surface of the images for evaluation and moving the same slidingly for 50 cycles under a load of 500 g, the printing density (%) was measured in the same manner as that before the sliding movement. The difference of the printing density before and after the sliding movement was determined and used as an evaluation index for the scratch resistance. It was evaluated as good (O) in a case where the difference of the printing density before and after the sliding movement was within 30%, as favorable (Δ) in a case where the difference exceeded 30% and within 35%, and as failed (x) in a case where the difference exceeded 35%.

(Evaluation 2) Water Proofness

By using each of the obtained compositions of Examples 1 to 7, 9 and Comparative Example 1, thus predetermined patterns were printed to form images for evaluation on gloss paper manufactured by Sharp Corp. (Photo gloss paper, trade name of products: product No.: AJ-K4AG) by using an ink jet recording apparatus obtained by modifying a commercially available ink jet recording apparatus (AJ2000, manufactured by Sharp Corp.). After leaving the images for evaluation at a room temperature for 3 hours starting from immediately after printing, they were exposed to running water for 10 sec and then dried for one day and one night and allowed to dry. The dried images for evaluation were observed visually and the extent of leaching of the ink composition from the printed portion was evaluated by five steps of 5, 4, 3, 2 and 1 successively from the case of less releasing, which was used as the evaluation index of the water proofness. It was evaluated as good (O) in a case of 5, 4 or 3, and evaluated as failed (x) in a case where it was 2 or 1 in the five step evaluation.

(Evaluation 3) Image Quality

Predetermined patterns were printed to form images for evaluation on common paper used for copying machine manufactured by Sharp Corp. (product No.: SF4AM3), by using each of the obtained compositions of Examples 1 to 7, 9 and Comparative Example 1 by using an ink jet recording apparatus obtained by modifying a commercially available ink jet recording apparatus (AJ2000, manufactured by Sharp Corp.). After leaving the images for evaluation for one day, the relative value for the line width of the pattern of each of images for evaluation relative to the line width 100 of a predetermined pattern was determined, which was used as the evaluation index for image quality. As the relative value for the line width is smaller, it indicates less blurrs of the images. In the evaluation for the image quality, it was evaluated as good (O) in a case where the relative value of the line width was less than 150, as favorable (Δ) where the value was 150 or more and 250 or less and as failed (x) in a case where it exceeded 250.

The result of the evaluations 1 to 3 is shown in Table 3.

TABLE 3

|  | Example | | | | | | | | Comp. Example |
| --- | --- | --- | --- | --- | --- | --- | --- | --- | --- |
|  | 1 | 2 | 3 | 4 | 5 | 6 | 7 | 9 | 1 |
| Evaluation 1 | O | O | O | O | O | O | O | Δ | x |
| Evaluation 2 | O | O | O | O | O | O | O | O | x |
| Evaluation 1 | O | O | O | O | O | O | O | O | x |

From the comparison between Examples 1 to 7 and 9, and Comparative Example 1, it was found that images formed by using the ink compositions of Examples 1 to 7 and 9 containing polyester resins in which the polybasic carboxylic acid ingredient contained the aromatic dicarboxylic acid having the metal sulfonate group showed higher quality with less blurrs and were more excellent in scratch resistance and water proofness than the images formed by using the ink composition of Comparative Example 1 not containing the polyester resin.

Further, from the comparison between Examples 1 to 7 and Example 9, it was found that the images formed by using ink compositions of Examples 1 to 7 containing polyester resins having glass transition points of −20° C. or higher and 70° C. or lower were more excellent in the scratch resistance than the images formed by using the ink composition of Example 9 containing a polyester resin having a glass transition point of 71° C. and exceeding 70° C.

(Evaluation 4) Discharge Stability

Each of the obtained ink compositions of Examples 1 to 8 and 10 obtained was filled in an ink tank of an ink jet recording apparatus obtained by modifying a commercially available ink jet recording apparatus (AJ2000, manufactured by Sharp Corp.) and printed continuously on common paper used for copying machine manufactured by Sharp Corp. (product number: SF4AM3) at a printing density of 5% and at a printing speed of 7 sheets of A4 series paper per min. In the test, the ink composition was re-filled at the instance the ink tank was emptied, and printing was conducted till the ink droplets of the ink composition were not discharged from the nozzle and the printing was no more possible. The number of printable sheets which could be printed completely up to the instance was determined and used as the evaluation index for the discharge stability. It was evaluated as good (O) in a case where the printable number of sheet was more than 200, as favorable (Δ) in a case where it was 150 to 200 sheets and as failed (x) in a case where it was less than 150 sheets. Table 4 shows the result of evaluation.

TABLE 4

|  | Example | | | | | | | | |
| --- | --- | --- | --- | --- | --- | --- | --- | --- | --- |
|  | 1 | 2 | 3 | 4 | 5 | 6 | 7 | 8 | 10 |
| Evaluation 4 | O | O | O | O | O | O | O | x | x |

From the comparison between Example 1 to 7 and Example 10, it was found that the ink compositions of Examples 1 to 7 containing polyester resins having the number average molecular weight of 5,000 or more and 50,000 or less were more excellent in the discharge stability than the ink composition of Example 10 containing the polyester resin having the number average molecular weight of 51,000 which exceeded 50,000.

Further, from the comparison between Examples 1 to 7 and Example 8, it was found that the ink compositions of Examples 1 to 7 containing glycol ethers were more excellent in the discharge stability than the ink composition of Example 8 not containing the glycol ethers.

As has been described above, ink compositions suitable to the ink jet recording at high quality with less blurrs and excellent in water proofness and scratch resistance could be attained by incorporation of the polyester resin in which the polybasic carboxylic acid ingredient contains the aromatic dicarboxylic acid having the metal sulfonate group. Further, a sufficient scratch resistance could be obtained in a case where the glass transition point Tg of the polyester resin was −20° C. or higher and 70° C. or lower. Further, a sufficient discharge stability could be obtained when the number average molecular weight of the polyester resin was 5,000 or more and 50,000 or less. Further, discharge stability could be improved by incorporation of glycol ethers.

(Ink sets 1-5)

The ink compositions of Examples 2 to 6 and 8 to 10 were combined, as shown in Table 5, as cyan, magenta and yellow ink compositions, to obtain ink sets 1 to 4, in which the cyan ink composition contained at least one of pigments of C.I. pigment blue 15:3 and 15:4, the magenta ink composition contained at least one of pigments selected from the group consisting of C.I. pigment red 122, 209 and C.I. pigment violet 19, and the yellow ink composition contained at least one of pigments selected from the group consisting of C.I. pigment yellow 74, 138, 150 and 180, as well as an ink set 5 in which all the cyan, magenta and yellow ink compositions contained pigments different from the pigments described above.

TABLE 5

|  | Cyan | Magenta | Yellow |
|---|---|---|---|
| Ink set 1 | Example 2<br>C.I. pigment<br>blue 15:3 | Example 4<br>C.I. pigment red 122 | Example 5<br>C.I. pigment yellow 74 |
| Ink set 2 | Example 2<br>C.I. pigment<br>blue 15:3 | Example 4<br>C.I. pigment red 122 | Example 6<br>C.I. pigment yellow 180 |
| Ink set 3 | Example 3<br>C.I. pigment<br>blue 15:4 | Example 4<br>C.I. pigment red 122 | Example 5<br>C.I. pigment yellow 74 |
| Ink set 4 | Example 3<br>C.I. pigment<br>blue 15:4 | Example 4<br>C.I. pigment red 122 | Example 6<br>C.I. pigment yellow 180 |
| Ink set 5 | Example 8<br>C.I. pigment<br>blue 17 | Example 9<br>C.I. pigment red 58 | Example 10<br>C.I. pigment yellow 13 |

The ink compositions for cyan, magenta and yellow were printed at a printing ratio of 1:1:1 respectively using the obtained ink sets 1 to 5 on gloss paper manufactured by Sharp Corp. (product No.: AJ-K4AG), by using an ink jet recording apparatus obtained by modifying a commercially available ink jet recording apparatus (AJ2000, manufactured by Sharp Corp), to form black images. Further, the ink composition of Example 7 was used as a black ink composition to form identical images.

For the obtained images, the lightness index L* and chromaticness index a*, b* in the L*a*b* calorimetric system (CIE: 1976) were measured by using a spectral calorimeter (X-Rite 938, manufactured by X-Rite Co.).

The result of the test was evaluated as described below. Assuming the chromaticness index a* as A1, and b* as B2 the black images formed by using the ink composition of Example 7, and assuming the chromaticness index a* as A2 and b* as B2 for each of the black images formed with ink sets 1-5, values for $\Delta a^*b^*$ represented by the following formula was determined and used as the evaluation index for the black color reproducibility.

$$\Delta a^*b^* = \{(A1-A2)^2 + (B1-B2)^2\}^{1/2}$$

Evaluation was made as good (O) in a case where the value for $\Delta a^*b^*$ was 20 or less ($\Delta a^*b^* \leq 20$), and as failed (x) in a case where it exceeded 02 ($\Delta a^*b^* > 20$). Table 6 shows the result of evaluation.

TABLE 6

|  | Test result |
|---|---|
| Ink set 1 | o |
| Ink set 2 | o |
| Ink set 3 | o |
| Ink set 4 | o |
| Ink set 5 | x |

From the comparison between the ink sets 1 to 4 and the ink set 5, it was found that the ink sets 1 to 4 comprising the cyan ink composition containing at least one of pigments of C.I. pigment blue 15:3 and 15:4, the magenta ink composition containing at least one of pigments selected from the group consisting of C.I. pigment red 122, 209 and C.I. pigment violet 19 and the yellow ink composition containing at least one of pigments selected from the group consisting of C.I. pigment yellow 74, 138, 150 and 180 are more satisfactory in the black color reproducibility and excellent in the color balance than the ink set 5 comprising the ink composition containing the pigments different from the pigments described above.

As described above, an ink set excellent in the color balance could be obtained by combining the cyan ink composition containing at least one of pigments of C.I. pigment blue 15:3 and 15:4, the magenta ink composition containing at least one of pigments selected from group consisting of C.I. pigment red 122, 290 and C.I. pigment violet 19, and the yellow ink composition containing at least one of pigments selected from the group consisting of C.I. pigment yellow 74, 138, 150, and 180.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An ink composition comprising:
   water;
   a colorant containing a pigment;
   a nonionic surfactant, the content of the nonionic surfactant being at a critical micelle concentration or more; and
   a polyester resin containing a polybasic carboxylic acid ingredient and a polyhydric alcohol ingredient,
      the polybasic carboxylic acid ingredient containing three or more dicarboxylic acids which include at least sodium 5-sulfoisophthalate and aromatic dicarboxylic acid not having a metal sulfonate group, wherein a ratio of the aromatic dicarboxylic acid having a metal sulfonate group contained in the polybasic carboxylic acid ingredient is 0.5 mol % or more and 3.5 mol % or less, and wherein the polyester resin has a number average molecular weight within a range of from 5,000 to 50,000, and the polyester resin has a glass transition point Tg within a range of from −20° C. to 70° C.

2. The ink composition of claim 1, wherein the polyhydric alcohol ingredient contains at least one glycol selected from the group consisting of aliphatic glycols and cycloaliphatic glycols.

3. The ink composition of claim 1, wherein electroconductivity of the water is 250 μS/cm or less.

4. The ink composition of claim 1, wherein the pigment has a hydrophilic group.

5. The ink composition of claim 4, wherein the hydrophilic group is at least one of carboxyl group and sulfonic group.

6. The ink composition of claim 1, wherein the ink composition further comprises a water-soluble organic solvent having a vapor pressure lower than that of the water.

7. The ink composition of claim 6, wherein the water-soluble organic solvent contains glycol ethers and/or polyhydric alcohols.

8. The ink composition of claim 1, wherein the pigment contains at least one pigment selected from the group consisting of C.I. pigment blue 15:3 and C.I. pigment blue 15:4.

9. The ink composition of claim 1, wherein the pigment contains at least one selected from the group consisting of C.I. pigment red 122, C.I. pigment red 209 and C.I. pigment violet 19.

10. The ink composition of claim 1, wherein the pigment contains at least one selected from the group consisting of C.I. pigment yellow 74, C.I. pigment yellow 138, C.I. pigment yellow 150 and C.I. pigment yellow 180.

11. The ink composition of claim 1, wherein the pigment contains a carbon black.

12. A recording method of recording images comprising: depositing an ink composition of claim 1 on a recording material.

13. A recording method of recording images comprising: discharging liquid droplets of an ink composition by applying a pressure to the ink composition; and
depositing the liquid droplets on a recording material, wherein for the ink composition is used the ink composition of claim 1.

14. A recording method of recording images comprising: depositing at least ink compositions (i), (ii) and (iii) on a recording material, said ink compositions (i), (ii) and (iii) each being a composition according to claim 1:
(i) wherein the colorant contains at least one pigment selected from the group consisting of C.I. pigment blue 15:3 and C.I. pigment blue 15:4;
(ii) wherein the colorant contains at least one pigment selected from the group consisting of C.I. pigment red 122, C.I. pigment red 209, and C.I. pigment violet 19; and
(iii) wherein the colorant contains at least one pigment selected from the group consisting of C.I. pigment yellow 74, C.I. pigment yellow 138, C.I. pigment yellow 150 and C.I. pigment yellow 180.

15. A recording method of recording images comprising: discharging liquid droplets of at least ink compositions (i), (ii) and (iii) by applying a pressure to the ink compositions; and
depositing the liquid droplets on a recording material, said ink compositions (i), (ii) and (iii) each being a composition according to claim 1:
(i) wherein the colorant contains at least one pigment selected from the group consisting of C.I. pigment blue 15:3, and C.I. pigment blue 15:4;
(ii) wherein the colorant contains at least one pigment selected from the group consisting of C.I. pigment red 122, C.I. pigment red 209, and C.I. pigment violet 19; and
(iii) wherein the colorant contains at least one pigment selected from the group consisting of C.I. pigment yellow 74, C.I. pigment yellow 138, C.I. pigment yellow 150 and C.I. pigment yellow 180.

16. A recording method of recording images comprising: depositing at least ink compositions (i), (ii), (iii) and (iv) on a recording material;
said ink compositions (i), (ii), (iii) and (iv), each being a composition according to claim 1:
(i) wherein the colorant contains at least one pigment selected from the group consisting of C.I. pigment blue 15:3, and C.I. pigment blue 15:4;
(ii) wherein the colorant contains at least one pigment selected from the group consisting of C.I. pigment red 122, C.I. pigment red 209, and C.I. pigment violet 19;
(iii) wherein the colorant contains at least one pigment selected from the group consisting of C.I. pigment yellow 74, C.I. pigment yellow 138, C.I. pigment yellow 150, and C.I. pigment yellow 180; and
(iv) wherein the colorant contains carbon black.

17. A recording method of recording images comprising: discharging liquid droplets of at least ink compositions (i), (ii), (iii) and (iv) by applying a pressure to the ink compositions, and
depositing the liquid droplets on a recording material, said ink compositions (i), (ii), (iii) and (iv) each being a composition according to claim 1:
(i) wherein the colorant contains at least one pigment selected from the group consisting of C.I. pigment blue 15:3, and C.I. pigment blue 15:4;
(ii) wherein the colorant contains at least one pigment selected from the group consisting of C.I. pigment red 122, C.I. pigment red 209, and C.I. pigment violet 19;
(iii) wherein the colorant contains at least one pigment selected from the group consisting of C.I. pigment yellow 74, C.I. pigment yellow 138, C.I. pigment yellow 150, and C.I. pigment yellow 180; and
(iv) wherein the colorant contains a carbon black.

18. A recorded image recorded by the recording method of claim 12.

19. A recorded image recorded by the recording method of claim 13.

20. An ink set comprising the following ink compositions (i), (ii) and (iii), each being a composition according to claim 1:
(i) wherein the colorant contains at least one pigment selected from the group consisting of C.I. pigment blue 15:3 and C.I. pigment blue 15:4,
(ii) wherein the colorant contains at least one pigment selected from the group consisting of C.I. pigment red 122, C.I. pigment red 209 and C.I. pigment violet 19, and
(iii) wherein the colorant contains at least one pigment selected from the group consisting of C.I. pigment yellow 74, C.I. pigment yellow 138, C.I. pigment yellow 150 and C.I. pigment yellow 180.

21. An ink set comprising the following ink compositions (i), (ii), (iii) and (iv), each being a composition according to claim 1:
(i) wherein the colorant contains at least one pigment selected from the group consisting of C.I. pigment blue 15:3 and C.I. pigment blue 15:4, (ii) wherein the colorant contains at least one pigment selected from the group consisting of C.I. pigment red 122, C.I. pigment red 209 and C.I. pigment violet 19, (iii) wherein the colorant contains at least one pigment selected from the group consisting of C.I. pigment yellow 74, C.I. pigment yellow 138, C.I. pigment yellow 150 and C.I. pigment yellow 180, and (iv) wherein the colorant contains a carbon black.

22. An ink head comprising:
an ink tank storing the ink composition of claim 1;
an ink chamber having a discharge port for discharging liquid droplets of the ink composition, the ink chamber being supplied with the ink composition from the ink tank;
a piezoelectric element disposed to at least a portion of the ink chamber, for applying a pressure to the ink composition contained in the ink chamber, the piezoelectric element generating distortion in response to a voltage applied thereto, and
an electrode for applying the voltage to the piezoelectric element.

23. An ink head comprising:
an ink tank storing the ink composition of claim 1;
an ink chamber having a discharge port for discharging liquid droplets of the ink composition, the ink chamber being supplied with the ink composition from the ink tank;
a heat generation body disposed to at least a portion of the ink chamber, for heating the ink composition contained in the ink chamber to generate air bubbles and thereby applying a pressure to the ink composition, and
an electrode for applying a voltage to the heat generation body.

24. A recorded image recorded by depositing liquid droplets of the ink composition which are discharged by the ink head of claim 22, on a recording material.

25. A recorded image recorded by depositing liquid droplets of the ink composition which are discharged by the ink head of claim 23, on a recording material.

26. The ink composition of claim 1 wherein the nonionic surfactant is a compound selected from the group consisting of (I), (II), (III), (IV) and (V),

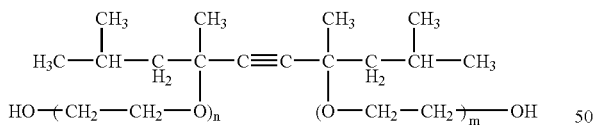
(I)

-continued

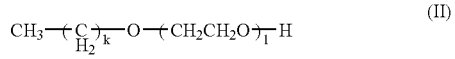
(II)

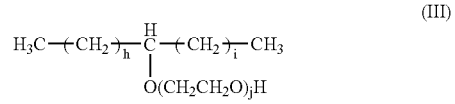
(III)

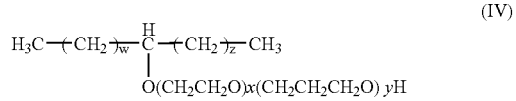
(IV)

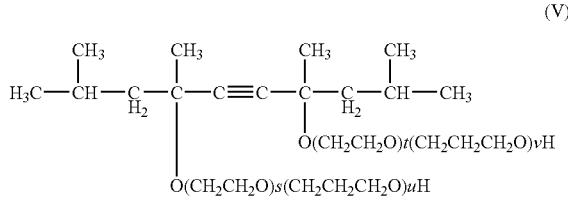
(V)

wherein m is an integer or decimal from 0 to 30 and n is an integer or decimal from 0 to 30, such that the sum of m and n (m+n) is an integer or decimal from 0 to 30, k is an integer or decimal from 11 to 13, and l is an integer or decimal from 3 to 30, h is an integer or decimal from 0 to 11, i is an integer or decimal from 0 to 11, and j is an integer or decimal from 3 to 50, such that the sum of h and i (h+i) is an integer or decimal from 9 to 11, w is an integer or decimal from 0 to 11, x is an integer or decimal from 5 to 9, y is an integer or decimal from 2.5 to 5, and z is an integer or decimal from 0 to 9, such that the sum of w and z (w+z) is an integer or decimal from 9 to 11, and the sum of s and t (s+t) is an integer or decimal from 1 to 30, and the sum of u and v (u+v) is an integer or decimal from 1 to 10.

27. The ink composition of claim 1, wherein the three or more dicarboxylic acids further include another aromatic dicarboxylic acid not having a metal sulfonate group, aliphatic dicarboxylic acid, or cycloaliphatic dicarboxylic acid.

* * * * *